US007736505B2

(12) United States Patent
Clukies

(10) Patent No.: US 7,736,505 B2
(45) Date of Patent: Jun. 15, 2010

(54) WATER POLLUTION PREVENTION AND REMEDIATION APPARATUS

(75) Inventor: Paul Arthur Clukies, 101158 Savannah Sparrow Way, Highlands Ranch, CO (US) 80129

(73) Assignee: Paul Arthur Clukies, Highlands Ranch, CO (US)

( * ) Notice: Subject to any disclaimer, the term of this patent is extended or adjusted under 35 U.S.C. 154(b) by 765 days.

(21) Appl. No.: 11/303,490

(22) Filed: Dec. 16, 2005

(65) Prior Publication Data

US 2006/0091080 A1  May 4, 2006

Related U.S. Application Data

(63) Continuation-in-part of application No. 10/342,595, filed on Jan. 15, 2003, now Pat. No. 7,138,055.

(51) Int. Cl.
C02F 1/40 (2006.01)

(52) U.S. Cl. .................... 210/242.4; 210/485; 210/488; 210/502.1; 210/924

(58) Field of Classification Search .............. 210/242.1, 210/242.3, 242.4, 483, 691, 693, 924, 485, 210/488, 502.1; 114/183 R
See application file for complete search history.

(56) References Cited

U.S. PATENT DOCUMENTS

| 3,537,587 A | 11/1970 | Kain | 210/242 |
|---|---|---|---|
| 3,679,058 A | 7/1972 | Smith | 210/242 |
| 3,702,657 A | 11/1972 | Cunningham et al. | 210/242 |
| 3,739,913 A | 6/1973 | Bogosian | 210/242 |
| 3,836,000 A | 9/1974 | Jakubek | |
| 3,888,766 A | 6/1975 | De Young | 210/36 |
| 3,960,719 A | 6/1976 | Bresson | 210/23 |
| 3,976,570 A | 8/1976 | McCray | 210/30 |
| 3,996,136 A | 12/1976 | Jakubek et al. | 210/86 |
| 4,031,839 A | 6/1977 | Pedone | 114/270 |
| 4,130,489 A | 12/1978 | Black | 210/242.4 |
| 4,461,614 A | 7/1984 | Niedermeyer | |
| 4,784,773 A | 11/1988 | Sandberg | 210/691 |
| 4,915,823 A | 4/1990 | Hall | 210/95 |
| 4,981,097 A | 1/1991 | Beyrouty | 114/228 |
| 5,186,831 A | 2/1993 | DePetris | 210/242.4 |
| 5,227,072 A | 7/1993 | Brinkley | 210/671 |
| 5,458,773 A | 10/1995 | Holland | 210/282 |
| 5,730,868 A | 3/1998 | Cordani | 210/242.4 |
| 5,863,440 A * | 1/1999 | Rink et al. | 210/693 |

(Continued)

Primary Examiner—Matthew O Savage
(74) Attorney, Agent, or Firm—Marsh Fischmann & Breyfogle LLP

(57) ABSTRACT

A fluid pollution prevention system for preventing the discharge of hazardous waste from a bilge of a marine vessel, and removal of the same from the bilge. The system includes an absorber for absorbing hazardous waste from a fluid in the bilge. The system further includes a locator for locating the absorber in a predetermined orientation relative to a bilge pump to prevent the discharge of hazardous waste from the bilge. In one embodiment of the invention, the locator is an upstanding member in relation to the fluid in the bilge and includes at least one locator channel defined along at least a portion of the locator for slidable receipt of the absorber. According to this characterization, the absorber is movable along the locator channel as a function of the bilge fluid level to absorb hazardous waste from the fluid and isolate an inlet of the bilge pump from receipt of the same.

5 Claims, 17 Drawing Sheets

U.S. PATENT DOCUMENTS

| | | | |
|---|---|---|---|
| 5,948,266 A | 9/1999 | Gore et al. | 210/693 |
| 6,083,402 A * | 7/2000 | Butler | 210/663 |
| 6,235,201 B1 | 5/2001 | Smith et al. | 210/691 |
| 6,398,966 B1 | 6/2002 | Smith et al. | 210/691 |
| 6,409,924 B1 | 6/2002 | Johnson | 210/691 |
| 6,712,957 B2 | 3/2004 | Papke | 210/112 |
| 7,138,055 B2 | 11/2006 | Clukies | |
| 2007/0086888 A1 | 4/2007 | Patel et al. | |

* cited by examiner

WATER POLLUTION PREVENTION AND REMEDIATION APPARATUS

CROSS REFERENCE TO RELATED APPLICATION

This application is a continuation-in-part of U.S. patent application Ser. No. 10/342,595 entitled "Water Pollution Prevention and Remediation Apparatus" which was filed on Jan. 15, 2003, now U.S. Pat. No. 7,138,055.

FIELD OF THE INVENTION

The invention is related to the field of water pollution prevention, and in particular, to preventing the discharge of hazardous waste, and recovery of the same, from a marine vessel.

BACKGROUND OF THE INVENTION

By design, substantially all potential fluid containment areas of a marine vessel, e.g., boat, offshore drilling platform, etc. drain toward a common collecting area known as a bilge. The bilge is typically located in a lower or bottom portion of a vessel and includes a pump. The pump is referred to in the art as a bilge pump, and upon accumulation of a predetermined amount of fluid in the bilge, the bilge pump is designed to pump the collected fluid overboard of the vessel.

An automatic switch activated by a float ("float switch"), controls operation of the bilge pump. The float switch functions to start and stop the pump according to the level of fluid contained in the bilge, as indicated by the float. The switch is electrically connected to the bilge pump such that as fluid accumulates in the bilge, the float floats upward with the fluid level until the switch is triggered to initiate operation of the pump, and begin pumping the fluid overboard. Similarly, as the fluid is pumped overboard and the fluid level in the bilge falls, the float floats down with the fluid level, where it again triggers the switch to terminate operation of the pump.

Due to the location of the bilge in the bottom of a vessel, hazardous waste, such as oil, gasoline, diesel fuel, grease, fuel, transmission fluid etc., are also subject to collection in the bilge along with non-hazardous fluids such as rainwater, air conditioner condensate, and water brought onto the vessel due to swimming and/or other activities. These hazardous waste fluids, if not removed prior to operation of the bilge pump, are discharged overboard with the other fluids, thereby polluting the surrounding waterway. Additionally, under current laws, the discharge of such hazardous waste fluids into a waterway is a source of liability for owners and operators of marine vessels. Therefore, a need exists in the art for preventing the discharge, as well as removal of, hazardous fluids from marine vessels.

SUMMARY OF THE INVENTION

In view of the foregoing, an object of the present invention is to provide an improved method and apparatus for preventing the discharge of hazardous fluids into a waterway. A related object of the present invention is to provide an improved method and apparatus for preventing or reducing the discharge of such hazardous fluids from their source or point of origination, namely a bilge area of a marine vessel. Another object of the present invention is to provide a method and apparatus for improved removal of hazardous fluids from a bilge area of a marine vessel. A related object of the present invention is to minimize or eliminate the introduction of hazardous fluids to a bilge pump in a marine vessel. Another object of the present invention is to provide an apparatus that improves remediation of hazardous fluids in the bilge area of a marine vessel.

In the context of the present invention, the term "marine vessel" includes any structure having a collection area, e.g., a bilge, for disposal of fluids into a waterway, with some examples including without limitation, boats, ships, offshore drilling platforms and the like, etc. Also, in the context of the present invention, hazardous waste fluids are referred to herein as petrochemicals and include at least hydrocarbon compounds such as crude oil, diesel, gasoline, transmission oil, gear oil and the like. Furthermore, it will be appreciated that due to the density difference and buoyancy forces between petrochemicals and water, petrochemicals float on the surface of water and are most notably apparent by the appearance of a shiny film. That is, petrochemicals and water do not mix due to the density difference and buoyancy forces therebetween. Rather, petrochemicals float on the surface of water in a separate buoyant layer. The inventor has recognized that this natural separation of petrochemicals and water may be utilized advantageously to isolate petrochemicals from an inlet of a bilge pump. Specifically, by isolating a fluid volume within the bilge from petrochemicals floating on the surface of fluid within the bilge, fluid from the isolated volume may be pumped out of the bilge substantially free of the floating petrochemicals. Accordingly, various apparatuses are disclosed herein for use in a system for isolating a bilge fluid volume from floating petrochemicals and pumping fluid from that isolated volume.

One or more of the above objectives and additional advantages may be realized by a first aspect of the present invention, which provides an absorber for removing petrochemicals from a fluid in a bilge area of a marine vessel. The absorber includes a frame having a geometric shape that defines an interior space or area within the absorber. The absorber further includes a petrochemical absorbent material configured in the geometric shape of the frame and connectable to the frame to form the absorber. Preferably, such material is hydrophobic, such that it is impervious to water and substantially only absorbs petrochemicals or other potentially hazardous fluids.

Various refinements exist of the features noted in relation to the subject first aspect of the present invention. Further features may also be incorporated in the subject first aspect as well. These refinements and additional features may exist individually or in any combination. For instance, according to one embodiment of the absorber, the interior area may be sized and shaped for positioning around a bilge pump of a marine vessel. In this regard, the absorber may operate to absorb petrochemicals from the fluid in the bilge as well as to isolate an inlet(s) of the bilge pump from receipt of petrochemicals. In the latter case, the absorber may be floatable on the fluid such that as the fluid is pumped from the bilge, the absorber lowers with the fluid to circumscribe the bilge pump, and specifically, the bilge pump inlet(s). In this case, the exact geometric shape of the frame is only limited by the requirement of defining an interior space/area sized and shaped to accommodate a bilge pump. Thus, the frame may be a rectangular, square, circular, ovular etc. shape as a matter of design choice. Additionally, the interior space/area defined by the frame may be fully or only partially enclosed.

In one arrangement, the absorber may include a cover material connected around the frame and absorbent material. The cover material may be a petrochemical absorbent material or may be a material that allows fluid and petrochemicals to pass through to the enclosed absorbent material. In another arrangement, the absorber may include an indicator to provide information to a user regarding the level of saturation of the absorbent material and thus the need for replacement of the same.

According to another aspect of the invention, a floating petrochemical absorber for positioning around a fluid outlet in a bilge of a marine vessel is provided. The absorber includes a petrochemical absorber material defining a closed geometric shape having an interior area. At least a first buoyant member is interconnected to the petrochemical absorber material, which is operative to maintain at least a peripheral portion of the petrochemical material at a fluid surface within the bilge of the marine vessel.

Various refinements exist of the features noted in relation to the subject aspect of the invention. For instance, the petrochemical absorber material may define a continuous member extending around the interior area, or, the petrochemical absorber material may be formed from an elongated member having first and second ends that abut and/or overlap. In any case, it is preferable the petrochemical absorbing material is substantially continuous around the periphery of the geometric shape such that the interior area may be kept substantially free of petrochemicals.

In one arrangement, the petrochemical absorber includes a top edge and a bottom edge. In this arrangement, the buoyant member is sized to maintain the bottom edge of the absorber material a predetermined distance below the fluid surface when that petrochemical absorbing material is substantially free of petrochemicals. This may prevent the passage of petrochemicals beneath the absorber when the absorber is substantially free of petrochemicals. Likewise, the buoyant member may be sized to maintain the top edge of the petrochemical absorbing material a predetermined distance above the surface when the petrochemical absorbing material is substantially saturated with petrochemicals. In this regard, even when saturated the absorber defines a sidewall above the surface of the fluid to prevent entry of floating petrochemicals into the interior area of the absorber.

According to another aspect of the present invention, a floating petrochemical absorber for positioning about a bilge fluid outlet in the bilge of a marine vessel is provided. The absorber includes a sidewall that defines a closed geometric shape having an interior area. The absorber further includes at least one buoyant member associated with the sidewall wherein the buoyant member is sized to maintain a surface of fluid within the bilge between a top edge and a bottom edge of the sidewall. Additionally, the absorber includes a petrochemical absorbing material that is interconnected to at least a portion of the sidewall for absorbing petrochemicals floating on the fluid.

In this arrangement, the sidewall forms a physical barrier to petrochemicals floating on the fluid surface when the fluid surface is between the top edge and bottom edge of the sidewall. To further prevent entry of petrochemicals into the interior area, the petrochemical absorbing material may be continuous about the outside surface of the sidewall. Further petrochemical absorbing material may also be interconnected to the inside surface of the sidewall. In the latter regard, the petrochemical absorbing material interconnected to the inside surface of the sidewall may remove petrochemicals that splash over the absorber into the interior area.

The buoyant member may be any member that provides the desired buoyancy to the absorber. For instance, any material having a specific gravity of less than 1 (i.e., a density less than water) may be utilized. In one arrangement, the buoyant member comprises an enclosed volume that houses a gas. For instance, the enclosed volume may include a volume of air.

Preferably, the buoyant member is sized to maintain the bottom edge of the sidewall a predetermined distance below the fluid surface when the petrochemical absorbent material is free of petrochemicals and to further maintain the sidewall a predetermined distance above the fluid surface when the petrochemical absorbent material is substantially saturated with petrochemicals. In this regard, the absorber may utilize multiple buoyant members disposed about the periphery of the geometric shape, or, utilize a single buoyant member that extends about portions or an entirety of the geometric shape.

According to another aspect of the invention, an absorber for absorbing petrochemicals from a bilge of a marine vessel is provided. The absorber includes a grated member that at least partially defines a first volume. The grated member includes a plurality of openings that permit liquid to flow into the first volume. A petrochemical absorbing material is at least partially positioned within the first volume. A buoyant member is associated with the grated member that maintains at least a portion of the petrochemical absorbing material at a level of a fluid surface within the bilge of a marine vessel.

In one arrangement, the grated member defines a closed geometric shape having an interior area. In this regard, the grated member may be continuous about an interior area. Alternatively, the grated member may include first and second ends that are disposed in overlapping or abutting relationship. In one arrangement, the petrochemical absorbing material is continuous about a periphery of the grated member. In another arrangement, the buoyant member is disposed within the first volume.

According to another aspect of the present invention, a method for absorbing petrochemicals from a bilge of a marine vessel is provided. The method includes positioning a buoyant absorber including a petrochemical absorbing material around a fluid outlet in the bilge of a marine vessel. The method further includes maintaining a surface level of fluid within a bilge at a location between a top edge and a bottom edge of buoyant absorber. In conjunction maintaining the surface level between the top and bottom edges, petrochemicals may be absorbed from a fluid surface of the interior space to define a fluid surface area substantially free of petrochemicals.

The method may further include removing fluid from the bilge. In this regard, this fluid may be removed from a fluid volume that is defined at its surface by the interior area, which is free of petrochemicals. This allows for removing fluid from the bilge substantially free of petrochemicals.

One or more of the above objectives and additional advantages may also be realized by another aspect of the present invention, which provides an apparatus for positioning a petrochemical absorber in a bilge area of a marine vessel. The apparatus includes a locator mountable in the bilge area in vertical relation to a fluid therein and a channel defined along at least a portion of the locator for slidable receipt of the absorber. The absorber is movable along the channel as a function of a fluid level in the bilge area.

Various refinements exist of the features noted in relation to the subject aspect of the present invention. Further features may also be incorporated in the subject second aspect as well. These refinements and additional features may exist individually or in any combination. For instance, the locator may be positioned in the bilge area in a generally upstanding relation to the fluid therein to define a predetermined path of travel for the absorber. In another instance, the locator may also laterally restrain the absorber during movement through the absorber's predetermined path of travel as determined by the locator.

According to one embodiment, the locator includes a single housing defining a channel from a lower portion connected to a base member to an upper portion proximate a maximum fluid level of a bilge area. According to another embodiment, the locator may include a pair of substantially parallel housings defining a first and second channel respectively from a lower portion connected to a base to an upper portion proximate a maximum fluid level of a bilge area. In the first embodiment, the locator may be configured for use with an enclosed or substantially enclosed absorber. In the latter embodiment, the locator may be configured for use with a semi-enclosed absorber such that a first end is slidably received in one of the channels and a second end is slidably received in the other one of the channels. According to this characterization, the locator may further include a sealing wall disposed between the two housings. The sealing wall may further include a passage for a discharge outlet conduit of a bilge pump. In this manner, the absorber is movable along the locator between lower and upper portions as a function of the fluid level.

In either of the above embodiments, the locator is preferably positioned proximate a bilge pump such that the absorber is operative to absorb petrochemicals from the surrounding bilge fluid and substantially prevent entry of petrochemicals into an inlet(s) of the bilge pump as the absorber is moved along the locator, as a function of the bilge fluid level.

One or more of the above objectives and additional advantages may also be realized by a further aspect of the present invention, which provides an apparatus for removal of petrochemicals from fluid in a bilge area of a marine vessel. The apparatus includes an absorber for absorbing petrochemicals and a locator for locating the absorber in the bilge area of a marine vessel. The locator may further include the channel defined along at least a portion of the locator for slidable receipt of the absorber, wherein the absorber is movable along the channel as a function of the fluid level in the bilge area.

Various refinements exist of the features noted in relation to the subject aspect of the present invention. Further features may also be incorporated in the subject third aspect as well. These refinements and additional features may exist individually or in any combination. For instance, the locator and absorber may be various combinations of the above set forth embodiments of locators and absorbers according to the present invention.

One or more of the above objectives and additional advantages may also be realized by another aspect of the present invention, which provides a method of removing petrochemicals from a fluid in a bilge of a marine vessel. The method comprises positioning a locator in the bilge of the marine vessel in an upstanding relation to a bilge fluid level and moving a petrochemical absorber along the locator using the fluid level. The method further includes absorbing petrochemicals from the fluid in the bilge area using the absorber.

Various refinements exist of the features noted in relation to the subject aspect of the present invention. Further features may also be incorporated in the subject fourth aspect as well. These refinements and additional features may exist individually or in any combination. For instance, the locator may be positioned proximate a bilge pump and the positioning step may include locating the bilge pump in an interior area of the absorber using the locator. Similarly, the absorbing step may include contacting petrochemicals with the absorber and absorbing the petrochemicals with a wicking action as the absorber is moved along locator.

One or more of the above objectives and additional advantages may also be realized by a further aspect of the present invention, which provides a method of removing petrochemicals from a fluid in a bilge of a marine vessel. The method comprises locating an absorber in a predetermined lateral position within the bilge, moving the absorber up and down within the bilge as a function of a fluid level, maintaining the lateral position of the absorber as the absorber moves up and down and absorbing petrochemicals from the fluid.

Various refinements exist of the features noted in relation to the subject aspect of the present invention. Further features may also be incorporated in the subject fifth aspect of the present invention as well. These refinements and additional features may exist individually or in any combination.

According to another aspect, an apparatus for isolating petrochemical in a bilge is provided that includes a base member for attachment to a surface of a bilge and a continuous sidewall interconnected to the base member. The continuous sidewall defines a vertically enclosed volume between a top edge and a bottom edge. In this regard, when disposed in an upright position in a bilge (e.g. transverse to a waterline I the bilge), the sidewall forms a barrier to petrochemicals floating on a fluid surface when the fluid surface is between the top edge and the bottom edge of the sidewall. The apparatus further includes at least one opening between the base member and the bottom edge of the sidewall that permits fluid to be introduced into the enclosed volume. More specifically, the opening allows fluid to be introduced into the enclosed volume from beneath a fluid surface when that fluid surface is between the top edge and the bottom edge of the sidewall.

Various refinements exist of the features noted in relation to the subject aspect. Further features may also be incorporated into the subject aspect as well. These refinements and additional features may exist individually or in any combination. For instance, the sidewall may define any closed geometric shape that includes an internal area, which may be sized for a particular purpose. Non-limiting examples of closed geometric shapes that may be utilized include: round, elliptical, regular polygonal, irregular polygonal and irregular shapes. The size of the internal area defined by the continuous sidewall may be sized to provide an enclosed volume (e.g., between the top and bottom edges) that is adapted to receive at least a portion or all of a bilge pump therein. In this regard, a bilge pump may be disposed within the enclosed volume to pump fluid out of the enclosed volume substantially free of petrochemicals. Further, a cap member may be disposed over a portion or all of the enclosed volume to prevent petrochemicals from splashing over the top edge of the sidewall and thereby entering the vertically enclosed volume.

In a further arrangement, the present aspect may also utilize a floating petrochemical absorber to further isolate the enclosed volume from petrochemicals. The floating petrochemical absorber may be operative to move in relation to a level of fluid within the bilge in conjunction with absorbing petrochemicals floating on the surface of the fluid. Such an absorber may be disposed about a portion or the entirety of the continuous sidewall and thereby at least assist in the isolation of the enclosed volume from floating petrochemicals. In one arrangement, the petrochemical absorber may define a closed geometric shape having an internal area sized for disposition about the continuous sidewall. In any arrangement, the sidewall may be utilized to maintain a lateral position of the absorber and/or define a path of travel for the absorber.

In one arrangement, the apparatus further includes a lip interconnected to at least a portion of the sidewall and extending outwardly relative to the vertically enclosed volume. This lip is operative to limit upward movement of a floating petrochemical absorber that may be disposed about at least a portion of the sidewall. Such a lip may be removably connected or positioned to the sidewall such that a floating petrochemical absorber disposed about the sidewall may be removed from the apparatus. Further, the lip may be continuous around the periphery of the sidewall or formed of a plurality of segmented portions. What is important is that the lip is operative to limit vertical movement of a floating petrochemical absorber. Further, an outside surface of the sidewall between the top edge and the bottom edge may be substantially vertical. This may permit a floating absorber disposed around at least a portion of the sidewall to move relative to the sidewall as a function of a level of fluid within the bilge.

The opening between the base member and the bottom edge of the sidewall permits fluid beneath the surface of fluid in a bilge to enter into the vertically enclosed volume free of petrochemicals floating on top of the fluid surface. In one arrangement, a plurality of such openings are disposed between the base member and the bottom edge of the continuous sidewall. In a further embodiment, these openings are sized to prevent debris of a predetermined size from entering into the enclosed volume. In another arrangement, the maximum height of these openings is no greater than the thickness of a floating absorber utilized with the apparatus. In another arrangement, the maximum height of the openings is no greater than one-half of the thickness of the floating absorber.

In another arrangement, the apparatus includes a fluid conduit having an inlet supportably positioned within the sidewall and an outlet extending out of the sidewall. This outlet may be fluidly connected to the inlet of a bilge pump. In such an arrangement the apparatus does not house a bilge pump but rather houses an inlet that is connectable to a bilge pump mounted in another location within the vessel. The inlet of the fluid conduit may be disposed between the top and bottom edges of the sidewall. Further, the inlet of the conduit may be selectively positionable relative to the sidewall. In a further arrangement, a cap member extends over an area defined by the annular sidewall. In this arrangement, the fluid conduit may pass through the cap member, which may at least in part support the fluid conduit.

According to another aspect of the invention, a method for isolating petrochemicals from a fluid volume within a bilge is provided. The method includes disposing a continuous sidewall in an upright position within a bilge where the sidewall defines a vertical barrier to petrochemicals floating within the bilge. Fluid is drawn into the interior of the vertical barrier (i.e. the vertically enclosed volume) through an opening in the sidewall disposed below a minimum fluid level in the bilge. Finally, the fluid may be removed from the vertically enclosed volume and removed from the bilge. The step of removing may include pumping fluid out of the vertically enclosed volume. In this regard, a pump may be disposed within the enclosed volume, or, fluid may be drawn out of the enclosed volume by the pump that is disposed outside of the enclosed volume.

Generally, the continuous sidewall may be disposed within the bilge such that it is substantially perpendicular to a waterline therein and/or perpendicular to the bottom/floor of the bilge compartment, and such that a portion of the sidewall is above a maximum desired fluid height in the bilge. In this regard, the method may further include initiating the operation of a fluid pump upon a fluid level reaching the maximum desired fluid height. Likewise, the method may include deactivating such a pump when the water level reaches a lower fluid height and/or a minimum desired fluid height The method may further include absorbing petrochemicals floating on the surface of the fluid within the bilge. This may include absorbing petrochemicals floating on the surface of the fluid at a location that is proximate to an outside periphery of the sidewall. In one arrangement, this may entail moving a petrochemical absorber relative to the sidewall as a function of the level of fluid within the bilge. This may also entail restricting the vertical movement of the petrochemical absorber to a predetermined maximum height and/or maintaining a lateral position of a petrochemical absorber relative to an outside surface of the sidewall.

According to another aspect of the invention, an apparatus is provided for removing fluid from a bilge of a marine vessel substantially free of petrochemicals. The device includes a fluid conduit having an inlet end and an outlet end wherein the outlet end is fluidly connectable to an inlet of a bilge pump. Of note, the pump may be located at a location outside of the bilge and/or out of the bilge fluid. The apparatus further includes a conduit locator for supporting an inlet end of the fluid conduit in a predetermined orientation relative to an isolated volume of fluid within the bilge of the marine vessel. The isolated fluid volume is substantially isolated from petrochemicals floating on a surface of fluid within the bilge.

The isolated volume may be at least partially defined by either or both a floating petrochemical absorber and/or a sidewall that is disposable at least partially transverse to fluid within the bilge. What is important is that the absorber and/or sidewall prevent floating petrochemicals from entering a surface area associated with the isolated volume. Such an isolated surface area may at least partially define the isolated volume. For instance, the isolated volume may be defined by the periphery of an isolated surface area as it extends between the surface of the fluid and a bottom surface of a bilge. In this regard, the isolated volume may be defined by a floating petrochemical absorber that defines an enclosed area. Alternatively, the isolated volume may be defined by a continuous sidewall that defines a vertically enclosed volume between first and second sidewall heights as measured from a base of the sidewall. Where a sidewall is utilized, the sidewall may further include at least one opening that is operative to permit fluid from beneath the surface of the bilge fluid to enter into the sidewall. Such an opening may be disposed near the base of the sidewall.

The conduit locator may be any member that is operative to support the fluid conduit relative to the enclosed volume. In this regard, the conduit locator may include a bracket that is adapted to hold the fluid conduit relative to one or more structures within the bilge. In any case, it is preferable that the conduit locator be operative to position the inlet of the conduit to a location within the isolated volume. Further, the locator may hold the inlet such that is spaced from a periphery of the volume (e.g., toward a center of the isolated volume). Further, the conduit locator may be operative to adjust a height of the inlet of the fluid conduit, for example, relative to a bilge surface.

According to another aspect of the present invention, a method for isolating petrochemicals from a fluid volume in the bilge of a marine vessel is provided. The method includes positioning an inlet of a fluid conduit within an isolated fluid volume. The isolated fluid volume is isolated from petrochemicals floating on a surface of fluid within a bilge. An outlet of the fluid conduit may be interconnected to a fluid pump. Once so connected, fluid may be drawn through the fluid conduit and discharged at a location outside of the bilge (i.e., into a waterway).

The method may include the steps of isolating the fluid volume within the bilge. Such isolating may include positioning a sidewall within the bilge and/or positioning a floating petrochemical absorber relative to the sidewall. Further, use of such a petrochemical absorber may include moving the petrochemical absorber relative to the sidewall as a function of the level of fluid within the bilge.

Positioning the inlet of the fluid conduit may include positioning the inlet at a predetermined height above a bottom surface of the bilge. The method may further include initiating operation of the pump when the fluid level reaches a maximum desired fluid height. Such pumping may be terminated upon fluid level reaching a minimum desired fluid height. In one arrangement, this minimum desired fluid height may be above the height of the inlet (e.g., as measured from a bottom surface of the bilge). In this regard, the inlet may be isolated from floating petrochemicals by being maintained within bilge fluid at a location beneath the floating petrochemicals.

According to another aspect of the present invention, a bilge pump is provided that is adapted for use with a floating absorber that isolates an inlet(s) of the pump from petrochemicals. The bilge pump is adapted to permit a floating absorber to move up and down along its outside surface. In this regard, the bilge pump acts as a locator that limits the lateral position of the absorber within a bilge of a marine vessel. The bilge pump includes a housing having a base, a sidewall and a top surface that collectively define an internal volume. The base is adapted for positioning relative to a bilge surface. At least one opening within the housing is disposed proximate to the base to allow bilge fluid to enter the internal volume. A fluid outlet extends out of the top surface of the housing. For instance, the fluid outlet may vertically exit the pump housing. Finally, the pump includes a fluid pumping device is at least partially disposed within the internal volume and which is operative to pump fluid from within the internal volume through the fluid outlet. As will be appreciated, use of an outlet extending through the top surface allows for a floating absorber to move along the outside surface of the pump housing free of obstruction that may be caused by a discharge/outlet extending through a sidewall of the pump housing.

In one arrangement, the bilge pump further includes a floating petrochemical absorber that is movable with a fluid level in a bilge. The petrochemical absorber may define a closed geometric shape having an internal area. In such an arrangement, the housing may be disposable within the internal area of the absorber. In this regard, the outside surface of the pump housing may define a travel path of the absorber as well as limit lateral movement of the absorber. In order to limit upward movement of the absorber, the outside surface of the bilge pump may further include a stop that extends laterally outward for restraining upward movement of the absorber. For instance, an outside surface of the housing may include a lip that extends around a portion or all of the pump housing.

In order to maintain a floating absorber about an outside surface of the pump housing, the pump may further include a fluid activated switch that maintains a fluid level between the top and bottom surface of the pump housing. Such a fluid activated switch may automatically initiate operation of the pumping device when a fluid reaches a first level (e.g., near the top of the housing) and may automatically terminate operation of the pumping device when the fluid recedes to a second lower level. In one arrangement, such a fluid activated switch may be incorporated into the pump. In another arrangement, such a fluid activated switch may include a float switch that is remotely positioned relative to the pump.

In one arrangement, the fluid pumping device includes an electric motor for operating a fluid displacement device. Such a fluid displacement device may include, without limitation, impellors, vanes, (e.g., rotary pumps), diaphragms, pistons (e.g., positive displacement pumps). To provide cooling to the electrical motor, it may be desirable for at least a portion of an outside surface of the motor to be disposed within the fluid flow path between the inlet and the vertical discharge. In a further arrangement, it may be desirable to completely immerse the outside surface of the motor within the fluid flow path between the inlet and vertical discharge.

In one arrangement, the housing comprises a body member and a base member that is removably connectable to the body member. In such an arrangement, the base member may include the base and one or more inlet openings and the body member may house the fluid pumping device. In such an arrangement, the base member may be adapted for fixed positioning relative to a surface in the bilge. Such an arrangement may allow for selectively exchanging the housing member and pumping device for maintenance purposes. In one arrangement, the base member may further include a plurality of openings that define a strainer for impeding entry of debris into the internal volume of the housing.

According to another aspect of the present invention, a system is provided for discharging fluid from a bilge substantially free of petrochemicals. The system includes a pump housing having a base for positioning relative to bilge surface. At least one inlet opening disposed proximate to the base of the pump housing allows fluid to enter the pump housing. A fluid outlet extends out of pump housing at a location above the inlet as measured from the base. A fluid pumping device that is at least partially disposed within the pump housing is operative to pump fluid within the pump housing through the fluid outlet. Finally, the device includes a petrochemical absorber that is disposed around at least a portion of an outside surface of the pump housing. This absorber is operative to move along outside source of the pump housing in correspondence with the fluid level within a bilge. In this arrangement, the outside surface of the pump housing defines a pathway for the petrochemical absorber.

In one arrangement, the fluid outlet is at least 4 inches above the height of the inlet as measured from the base. In a further arrangement, the fluid outlet is at least 5 inches above the height of the inlet as measured from the base. In these arrangements, the fluid outlet may discharge horizontally from the housing while still permitting the outside surface of the housing to define a pathway for the absorber between, for example, a high fluid level in a low fluid level within the bilge.

According to another aspect, a method is provided for use in removing fluid from a bilge of a marine vessel. The method includes positioning a bilge pump within a bilge of a marine vessel and disposing a petrochemical absorber about at least a portion of a housing of the bilge pump. As will be appreciated, the petrochemical absorber may be utilized to isolate an inlet of the bilge pump from petrochemicals floating on the surface of fluid within the bilge. Further, the petrochemical absorber may be moved along the outside surface of the pump housing with a fluid level of the bilge. More specifically, the petrochemical absorber may be moved along a pathway defined by the pump housing between a minimum vertical position (e.g., a bilge surface supporting the pump) and a maximum vertical position. The method further includes operating a fluid displacement device that is disposed within the pump housing to pump fluid out of the pump housing at a location above the maximum vertical position of the petrochemical absorber.

The method may further include disposing the petrochemical absorber about an entirety of the pump housing. For instance, a petrochemical absorber defining a closed geometric shape having an internal area (e.g., annular) may be disposed around the housing of the bilge pump. In this regard, the pump housing may be utilized to limit the lateral position of the absorber within the bilge. Further, in any arrangement the pump housing may be utilized to restrain vertical movement of the absorber at the maximum vertical position.

In one arrangement, operation of the fluid displacement device includes pumping fluid vertically out of the pump housing at a location above the maximum vertical position of the petrochemical absorber. In an alternate arrangement, the fluid displacement device is operative to pump fluid horizontally out of the pump housing at a location above the maximum vertical position of the petrochemical absorber. What is important is that the outside surface of the pump housing is substantially free up protrusions that would limit movement of the petrochemical absorber along the pathway defined by the pump housing between the minimum and maximum vertical positions.

Furthermore, additional aspects, advantages and applications of the present invention will be apparent to those skilled in the art upon consideration of the following.

DETAILED DESCRIPTION

Reference will now be made to the accompanying drawings, which at least assist in illustrating the various pertinent features of the present invention. In this regard, the following description is presented for purposes of illustration and description and is not intended to limit the invention to the form disclosed herein. Consequently, variations and modifications commensurate with the following teachings, and skill and knowledge of the relevant art, are within the scope of the present invention. The embodiments described herein are further intended to explain the best modes known of practicing the invention and to enable others skilled in the art to utilize the invention in such, or other embodiments and with various modifications required by the particular application (s) or use(s) of the present invention.

Figure 1:
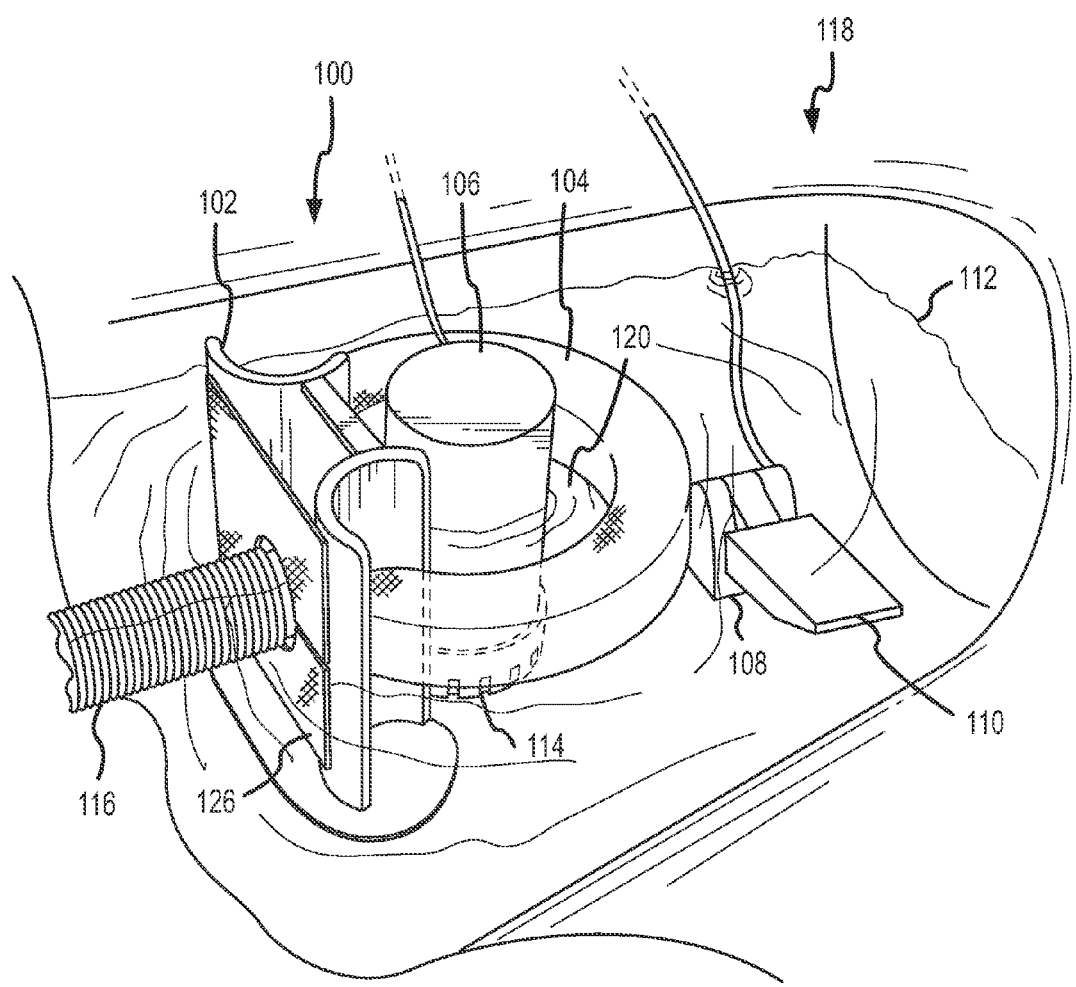
FIG. 1 illustrates a water pollution prevention apparatus installed in a bilge of a marine vessel.

As shown in FIG. 1, a water pollution prevention apparatus 100 includes a locator 102 and an absorber 104. The water pollution prevention apparatus 100 is designed for mounting in a bilge 118 of a marine vessel. While the apparatus 100 may be mounted at various locations within the bilge 118, the water pollution prevention apparatus 100 is most advantageous when positioned proximate a bilge pump 106, such that an interior space 120, of the absorber 104 is positionable around the pump 106. Alternatively, however, it will be appreciated from the following description that other mounting locations are possible and anticipated to achieve the objects and advantages of the present invention, namely preventing the discharge of petrochemicals from marine vessels and removal of the same from bilge areas, e.g., bilge 118.

By way of background, the bilge pump 106 may be any one of numerous types of bilge pump systems utilized in marine vessels. For purposes of illustration, however, the bilge pump 106 is shown on FIG. 1 to include components that are typically included on bilge pump systems. In this regard, the bilge pump 106 includes fluid inlets 114 disposed around its base, as well as a fluid outlet conduit 116, connected to a location external to the bilge 118. During operation of the pump 106, the fluid 112 is drawn into the fluid inlets 114 from the bilge 118 and discharged overboard of the vessel through the outlet conduit 116. It will be appreciated that in a typical bilge pump system, such as bilge pump system 106, it is desirable to locate the fluid inlets 114 at the lowest practical point within the bilge 118 to facilitate removal of a maximum amount of fluid 112 during operation of the pump 106.

An automatic float switch 108, that includes a float 110, controls operation of the pump 106. The float switch 108 functions to start and stop the pump 106 according to a level of fluid 112 contained within the bilge 118, as indicated by the float 110. The float switch 108 is electrically connected to the pump 106 such that as the fluid 112 accumulates in the bilge 118, the float 110 floats upward with the fluid 112 until the float switch 108 is triggered to initiate operation of the pump 106 and begin pumping the fluid 112 overboard; most commonly through a discharge tube or hose, e.g., conduit 116, between the bilge pump discharge port and an exit orifice located external to the vessel. Similarly, as the fluid 112 is pumped overboard and the level of fluid 112 falls, the float 110 floats down with the level of fluid 112 and again triggers the float switch 108 to terminate operation of the pump 106.

The locator 102, of the water pollution prevention apparatus 100, operates to position the absorber 104 within the bilge 118 as the level of fluid 112 moves up and down between pumping cycles. Specifically, as the fluid 112 moves up within the bilge 118 the absorber 104 is floated up along the locator 102 with the fluid 112. Likewise as the level of fluid 112 drops, the absorber 104 moves down the locator 102 with the level of fluid 112. Thus, the locator 102 defines a predetermined path of travel for the absorber 104 as a function of the level of fluid 112 in the bilge 118.

The locator 102 also maintains lateral positioning of the absorber 104 within the bilge 118. Preferably, such lateral positioning locates the absorber 104 around the bilge pump 106, as the level of fluid 112 moves up and down between pumping cycles. In this regard, the absorber 104 includes the interior area 120, which is substantially free from petrochemicals. Further, the absorber 104 preferably comprises a material that absorbs petrochemicals from the fluid 112, such that petrochemicals are unable to pass under or through the absorber 104. This in turn maintains the area 120 substantially free from petrochemicals; thereby isolating the inlets 114 of the bilge pump 106 from receipt of petrochemicals. According to this characterization, as the level of fluid 112 drops in the bilge 118, the absorber 104 and interior area 120, are moved down along the locator 102 to a position where the absorber 104 circumscribes the fluid inlets 114 of the pump 106. This in turn isolates the inlets 114 during operation of the pump 106 from receipt of petrochemicals, thereby preventing their discharge into the adjacent waterway(s).

Furthermore, where petrochemicals are introduced into the area 120, such as by splashing over the top of the absorber 104, the petrochemicals should be absorbed into the absorber 104 prior to reaching the inlets 114. This follows from the inherent operational characteristics of the bilge pump 106, in combination with the design and operational characteristics of the present water pollution prevention apparatus 100. For instance, since the pump 106 only operates when the fluid 112 reaches a predetermined height or level, if splash-over occurs with less than the predetermined fluid level, the pump 106 is non-operational and the absorber 104 has time to absorb any splashed over petrochemicals in the area 120 prior to operation of the pump 106. If on the other hand, the fluid level is at or close to the predetermined level, e.g., where the pump 106 is about to be operated, the absorber 104 should still absorb substantially all of the petrochemicals prior to the fluid level dropping to a point where petrochemicals on the surface can be drawn into the inlets 114. In this regard, it is anticipated that due to the relatively small size of the area 120, relative to the bilge 118, substantially all, if not all, of any petrochemicals introduced in the area 120 will be quickly absorbed by the absorber 104.

It should also be noted, that the absorber 104 may be constructed in a variety of predetermined thicknesses, as a function of the vessel for which it is to be used. For instance, a thicker absorber 104 increases the availability of absorbent material for absorbing petrochemicals from the fluid 112. Furthermore, a thicker absorber 104 minimizes the amount of splash-over of fluid 112 into the area 120, which as noted, may briefly introduce petrochemicals 300 into the area 120. Thus, by utilizing a thicker absorber 104 in vessels that are more susceptible to turbulent conditions, the introduction of petrochemicals via splash-over into the area 120 may be further minimized.

Figure 2:
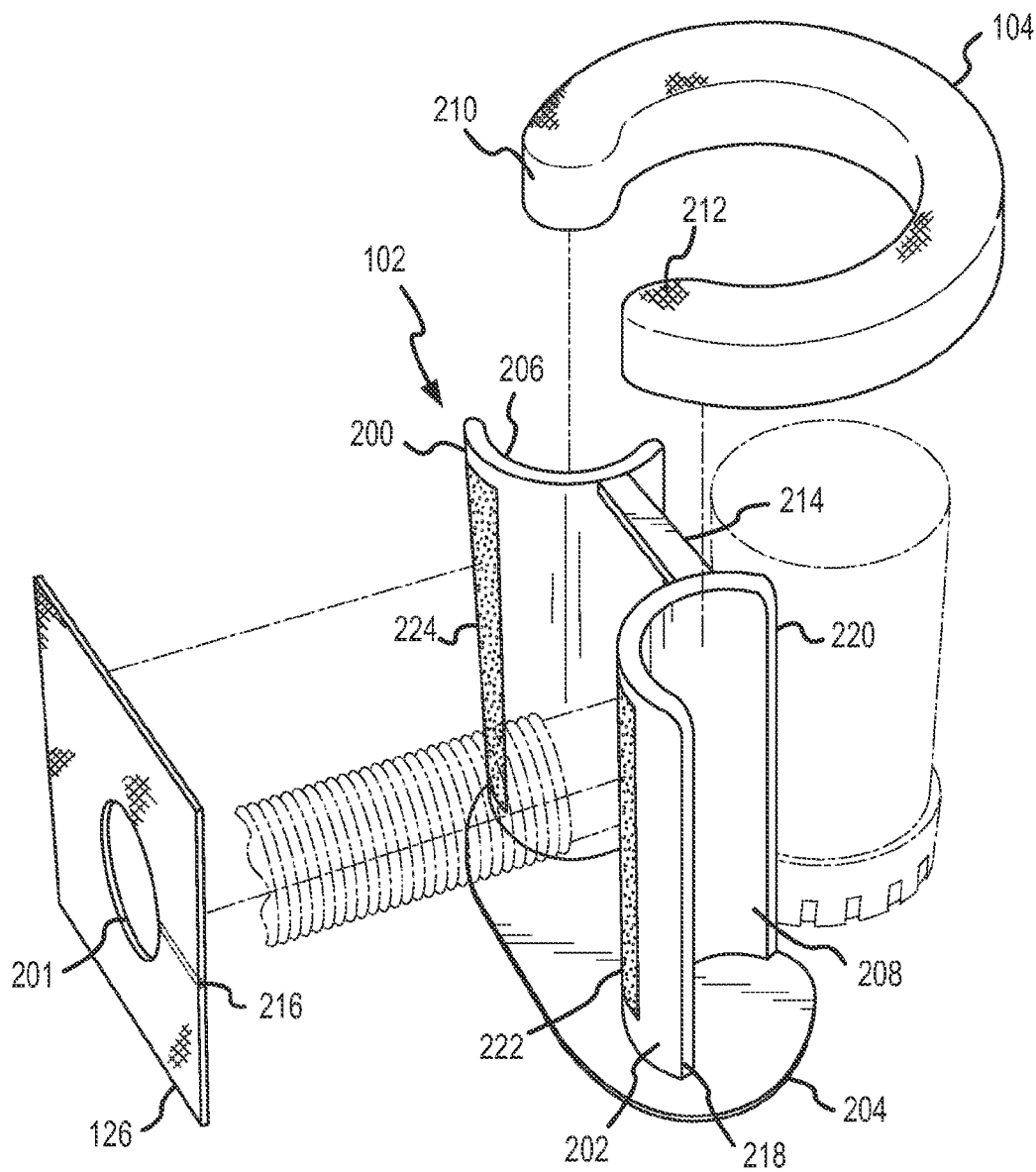
FIG. 2 illustrates an assembly view of the water pollution prevention apparatus of FIG. 1.

Referring to FIG. 2, according to one embodiment of the present water pollution prevention apparatus 100, the locator 102 includes a pair of housings, 200 and 202. The housings, 200 and 202, are connected in parallel relation to each other and perpendicular relation to a base member 204. The base member 204 is in turn, mountable within the bilge 118. The housings, 200 and 202, are generally upstanding relative to the base member 204 such that when the base member 204 is mounted in the bilge 118, the housings, 200 and 202, are in a substantially perpendicular relation to the fluid 112. This in turn controls the direction and facilitates movement of the absorber 104 as a function of the level of fluid 112 in the bilge 118. In addition, while not necessary to the present invention, a brace, such as brace 214, may also be included between the housings, 200 and 202, to provide additional stability to the locator 102.

As will be appreciated, the locator 102 including the housings, 200 and 202, and base 204, may be constructed from numerous types of materials as a matter of design choice. Preferably, however, such materials are chosen as a function of their corrosion resistance and durability in damp environments. Some examples of exemplary materials may include without limitation, plastics, fiberglass, and/or stainless steel.

The housings, 200 and 202, each include or define a locator channel, 206 and 208, respectively. The locator channels, 206 and 208, function as an interface for the slidable connection of a first end 210 and second end 212 of the absorber 104. In this regard, the housings, 200 and 202, are positioned on the base member 204 in a spaced relation such that the ends, 210 and 212, are insertable into the top of the channels, 206 and 208, to provide a slidable connection therebetween. Advantageously, such a connection provides a slidable engagement between the locator 102 and the absorber 104, as well as a detachable connection therebetween, e.g., the absorber 104 may be removed by sliding the ends, 210 and 212, out of the top of the channels, 206 and 208. This in turn facilitates simple replacement of the absorber 104 in the event it becomes worn or saturated with petrochemicals. Furthermore, as illustrated on FIG. 2, such positioning of the housings, 200 and 202, may also include a slight inward rotation of the channels, 206 and 208, relative to the absorber 104. As will be appreciated, the inward rotation minimizes the opening between the ends, 210 and 212, of the absorber 104 and maximizes the amount of absorption capability for a given absorber 104.

The absorber 104 is maintained in a substantially perpendicular orientation relative to the locator 102 through floatation on the fluid 112. In this regard, the absorber 104 is free to move with the level of fluid 112 between an upper portion 220 and lower portion 218 of the locator 102. In other words, the locator 102 operates as a vertical guide for the absorber 104, which is floated up and down within the bilge 118 as a function of the amount of fluid 112 contained therein. It will be appreciated in this regard, that the dimensions of the housings, 200 and 202, are a function of the maximum level of fluid 112 that is permitted in a given bilge, e.g., 118, as well as the size of a given bilge pump, e.g., 106. In other words, the housings, 200 and 202, should be of sufficient height to accommodate movement of the absorber 104 between a maximum fluid level and a minimum fluid level. Further, the housings, 200 and 202 should be of sufficient size to accommodate the size of a given absorber 104, which in turn is a function of bilge pump size and desired amount of absorption material. Thus, the housings, 200 and 202, may be constructed in different dimensions, as a matter of design choice, to accommodate different vessel sizes, e.g., larger vessels having the ability to accommodate more fluid 112 within their bilges and having larger pumps than smaller vessels.

The locator 102 may also include a sealing wall 126 covering the backside of the housings, 200 and 202. The sealing wall 126 includes an aperture 201 appropriately sized to accommodate the outlet conduit 116 of the bilge pump 106. In one example, the sealing wall 126 may be detachably connected to the housings, 200 and 202, to facilitate installation of the water pollution prevention apparatus 100. Those skilled in the art will appreciate numerous methods that may be utilized as a matter of design choice to provide the detachable connection of the sealing wall 126; with one example being, Velcro strips 222 and 224. The sealing wall 126 may also include a slot 216 to permit the sealing wall 126 to be snapped over the outlet conduit 116 during connection. In other words, the opposing sides of the slot 216 may be bent in opposite directions to provide a larger opening for the conduit 116 to pass through the slot 216 during connection. It should be noted that, according to this embodiment, the sealing wall 126 also operates to enclose the interior area 120 of the absorber 104 to prevent entry of petrochemicals. Thus, in this case, petrochemicals are prevented from entering the area 120, as they are unable to pass through the sealing wall 126, as well as under, or through the absorber 104.

As with the locator 102, base 204, and housings, 200 and 202, the sealing wall may be constructed from numerous types of materials as a matter of design choice. Preferably, however, such materials are chosen as a function of their corrosion resistance and durability in damp environments. Some examples of exemplary materials may include without limitation, plastics, fiberglass, and/or stainless steel.

In another example of the present water pollution prevention apparatus 100, the sealing wall may be constructed from or covered with a material that absorbs petrochemicals 300. Advantageously, this increases the absorption and removal capacity of a given apparatus 100. As discussed further below, some examples of such materials include those having a cellular material sufficiently open to allow the fluid 112 to pass freely and yet remain oil wet (oleophilic) when contacted by an oil-water mixture, e.g., petrochemicals 300.

Figure 3:
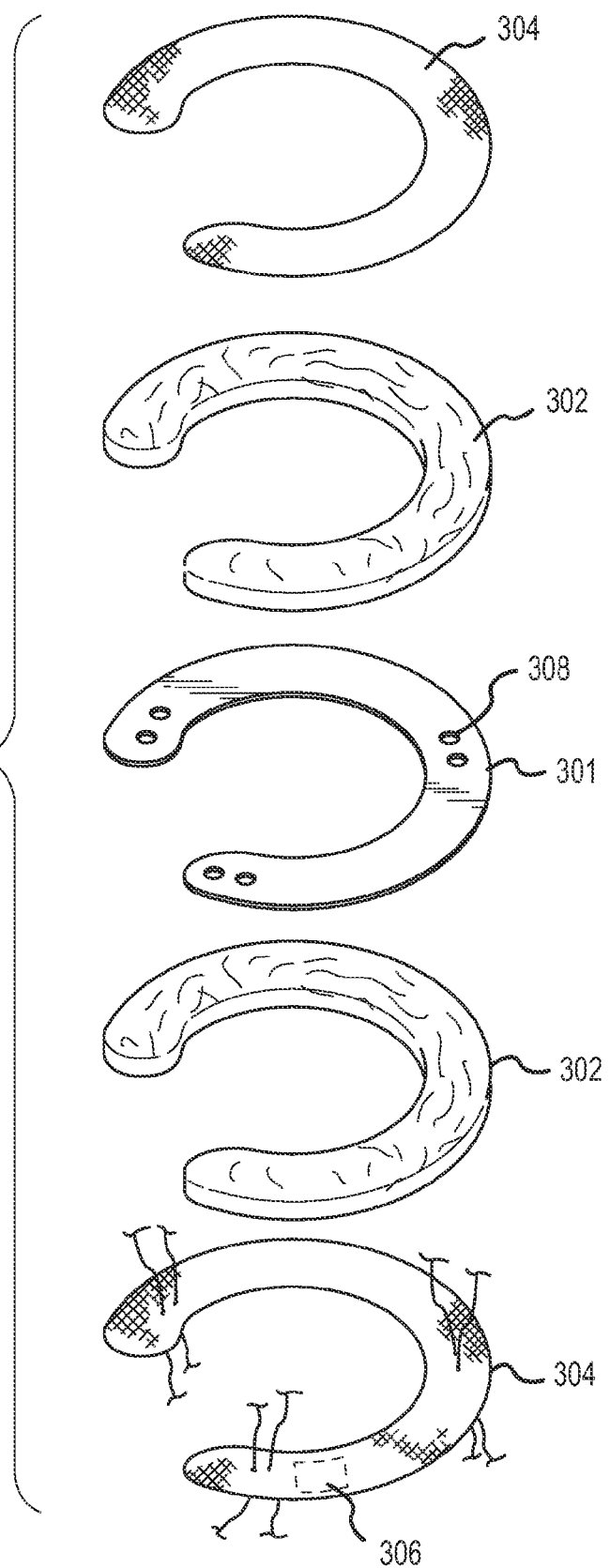
FIG. 3 illustrates an assembly view of an absorber for the water pollution prevention apparatus of FIG. 1.

FIG. 3 illustrates an assembly view of the absorber 104 according to the present invention. The absorber 104 includes a support member, e.g., a frame 301, a first material 302, and a cover material 304. The frame 301 is designed to provide support and rigidity to the absorber 104 to facilitate movement along the locator 102. Specifically, the frame 301 reduces deformation of the absorber 104 as it absorbs petrochemicals, thereby reducing binding of the ends, 210 and 212, within the locator channels, 206 and 208, respectively. This is especially advantageous as the absorber 104 becomes saturated with petrochemicals.

Taking into consideration the intended environment of use, it will be appreciated that the frame 301 may be constructed from numerous materials as a matter of design choice. Some examples of such materials include without limitation plastics and fiberglass. Furthermore, the frame 301 may be a highly porous polymer structure known as fully reticulated open-cell foam, such as polyurethane. Advantageously, such a material provides rigidity as well as providing an effective petrochemical collecting action to improve efficiency of the absorber 104. Additionally, the hydrophobic character of polyurethane foam coupled with its lightweight and relatively high specific gravity, normally in the range of 1.00 and 1.20, provides an ideal material for constructing a buoyant absorber 104 that is well adapted to serve as a floating petrochemical collection structure for the water pollution prevention apparatus 100.

While the frame 301 is shown in a semi-circular configuration on FIG. 3, it will be appreciated the frame 301 may be any geometric shape that includes an interior space, e.g., 120, sized and shaped to accommodate a bilge pump, such as pump 106. Thus, the frame 301 may be a variety of shapes including without limitation, ovular, square, rectangular, triangular, etc. each of which may be a fully enclosed or semi-enclosed structure.

The material 302 may be any material that absorbs petrochemicals 300. The material 302 may be a single piece of material or multiple pieces of material, as illustrated on FIG. 3, that are formed in the shape of the frame 301, e.g., in the illustrated embodiment, a semi-circular shape. Some examples of petrochemical absorbent materials suitable for use include those having a cellular material sufficiently open to allow the fluid 112 to pass freely and yet remain oil wet (oleophilic) when contacted by an oil-water mixture. As used herein, the term "cellular material" is intended to denote a variety of materials, including open-cell foams or sponges, and also fibrous mats, or pads, fabricated from such substances as asbestos fibers, hay, straw, cotton, synthetic fibers, such as synthetic rubber and the like. Some further examples include without limitation, generic polymers, such as polyester, polyethyl, and polyurethane foams.

In another embodiment of the absorber 104, the material 302 may be constructed from cellular materials impregnated with a hydrophobic and oleophilic sealant in a sufficient amount to coat the surfaces of the cells or capillary domains for use in absorbing oil and like pollutants. One example of such a material may be formed by impregnating a sheet of open-celled polyurethane foam with a solution of latex sealant that is inert to water but capable of being swelled in oil.

The cover material 304 may be any material suitable to maintain the petrochemical absorbing material 302 in the predetermined shape of the frame 301 and strong enough to permit physical handling even after a considerable weight of petrochemicals are absorbed. Furthermore, the cover material 304 may itself be adapted to serve as an oil collection material that operates in combination with the material 302 to absorb petrochemicals from the fluid 112. Similarly, the cover material 304 may be a petrochemical resistive material, such as polypropylene or polyethylene mesh or netting material, that permits fluid 112 and petrochemicals to pass freely through the cover material 304 into the material 302. In the first case above (where the cover material 304 is petrochemical absorbent), it may be desirable to sew the cover material 304 around the material 302 and frame 301 as the absorber 104 would be replaced upon saturation with petrochemicals 300. In this case, the frame 301 may also include apertures as exemplified by aperture 308, to facilitate attachment of the cover material 304 and/or the material 302. The apertures 308 also serve to hold the material 302 in the correct position relative to the frame 301.

In the latter case (where the cover material 304 is resistive to petrochemicals), it may be desirable to use a detachable connection such as Velcro to attach the cover material 304 around the material 302 and frame 301. This in turn facilitates replacement of the material 302 upon saturation of the same without the necessity of replacing the frame 301 and cover material 304.

In another embodiment of the absorber 104, the absorber 104 may also include an indicator 306 to provide information to a user regarding the level of saturation of the material 302, and thus, the need to replace the material 302 and/or the absorber 104 in its entirety. In one example, the indicator 306 may be an opening provided in the cover material for viewing of the enclosed material 302. In addition, the indicator opening or window may further include a transparent material sewn into the cover material 304 to protect the enclosed material 302.

Figure 4:
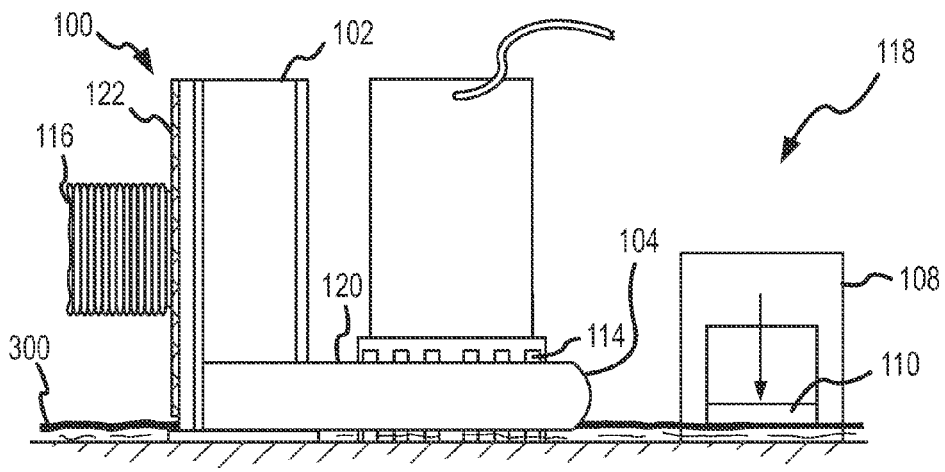
FIGS. 4-6 illustrate an operation protocol for the water pollution prevention apparatus of FIG. 1.
Figure 5:
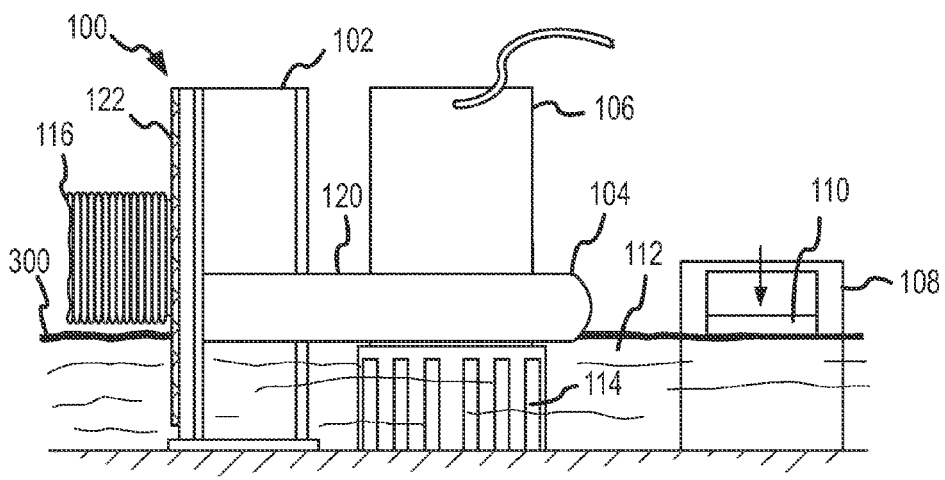
Figure 6:
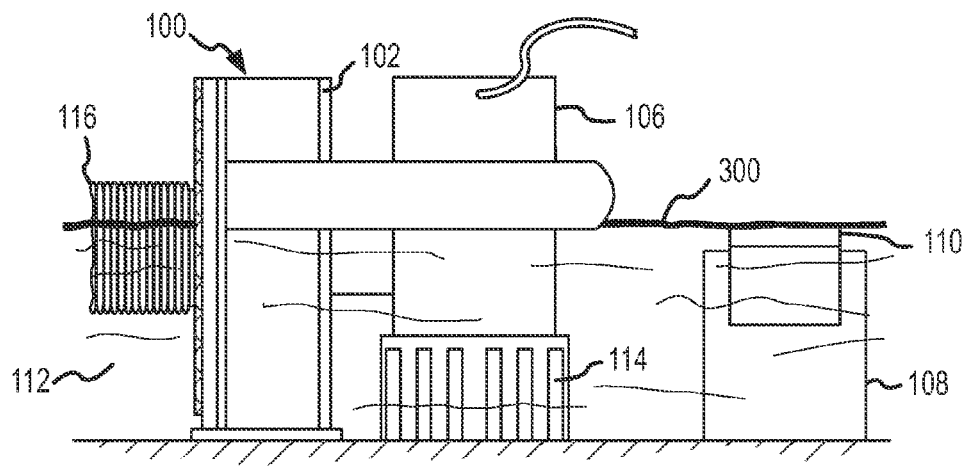

Referring to FIGS. 4-6, one example of an operational protocol for the present water pollution prevention apparatus 100 is provided. Referring first to FIG. 4, there is shown the water pollution prevention apparatus 100 installed in a bilge, such as 118, containing both fluid 112 and petrochemicals 300. The water pollution prevention apparatus 100 is installed in the bilge 118, such that the absorber 104 is positioned around the bilge pump 106. Specifically, the absorber 104 is positioned around the bilge pump 106 such that the fluid inlets 114 are contained within the interior area 120 provided by the absorber 104 and sealing wall 126 when the level of fluid 112 is below the fluid inlets 114, as illustrated on FIG. 4. This in turn isolates the fluid inlets 114 from the petrochemicals 300 minimizing the discharge of the same overboard of a vessel into a surrounding waterway(s). Referring also to FIGS. 5 and 6, during a typical cycle of the bilge pump 106, the level of the fluid 112 will begin to rise as fluid 112 collects in the bilge 118. As the level of the fluid 112 rises, the absorber 104 is floated with the rising fluid 112 upward along the locator 102. When the fluid 112 reaches a maximum fluid level, determined by the design and installation of the bilge pump 106, the float 110 trips a circuit in the float switch 108 to supply a current to the pump 106, thereby beginning operation of the same. As the pump 106 empties the fluid 112 from the bilge 118, the absorber 104 floats downward with the dropping fluid 112. It should be noted, that during operation of the pump 106 only the fluid 112 is pumped through the inlets 114 as the petrochemicals 300 remain on the surface of the fluid 112 away from the fluid inlets 114. Similarly, as the level of fluid 112 falls below the fluid inlets 114, as shown in FIG. 4, the absorber 104 circumscribes the inlets 114 substantially preventing the introduction of petrochemicals 300. In this manner, the water pollution prevention apparatus 100 operates to isolate the bilge pump 106, and particularly the fluid inlets 114, from the introduction of petrochemicals 300. It will be appreciated that FIG. 4 is provided for purpose of illustration, and that subsequent to an initial installation and operation of the pump 106, the float 110 may cease operation of the pump 106 prior to the fluid level falling below the inlets 114. This in turn, prevents cavitation of the pump 106.

Furthermore, the water pollution prevention apparatus 100 also absorbs for later removal, petrochemicals 300 from the fluid 112 and bilge 118. In this regard, as petrochemicals 300 encounter the absorber 104, such as via the fluid 112 sloshing around in the bilge 118, they are absorbed into the absorber 104 by a wicking action. In addition, as noted, the materials of the absorber 104 are preferably hydrophobic such that substantially only the petrochemicals 300 are absorbed and retained in the absorber 104.

Figure 7:
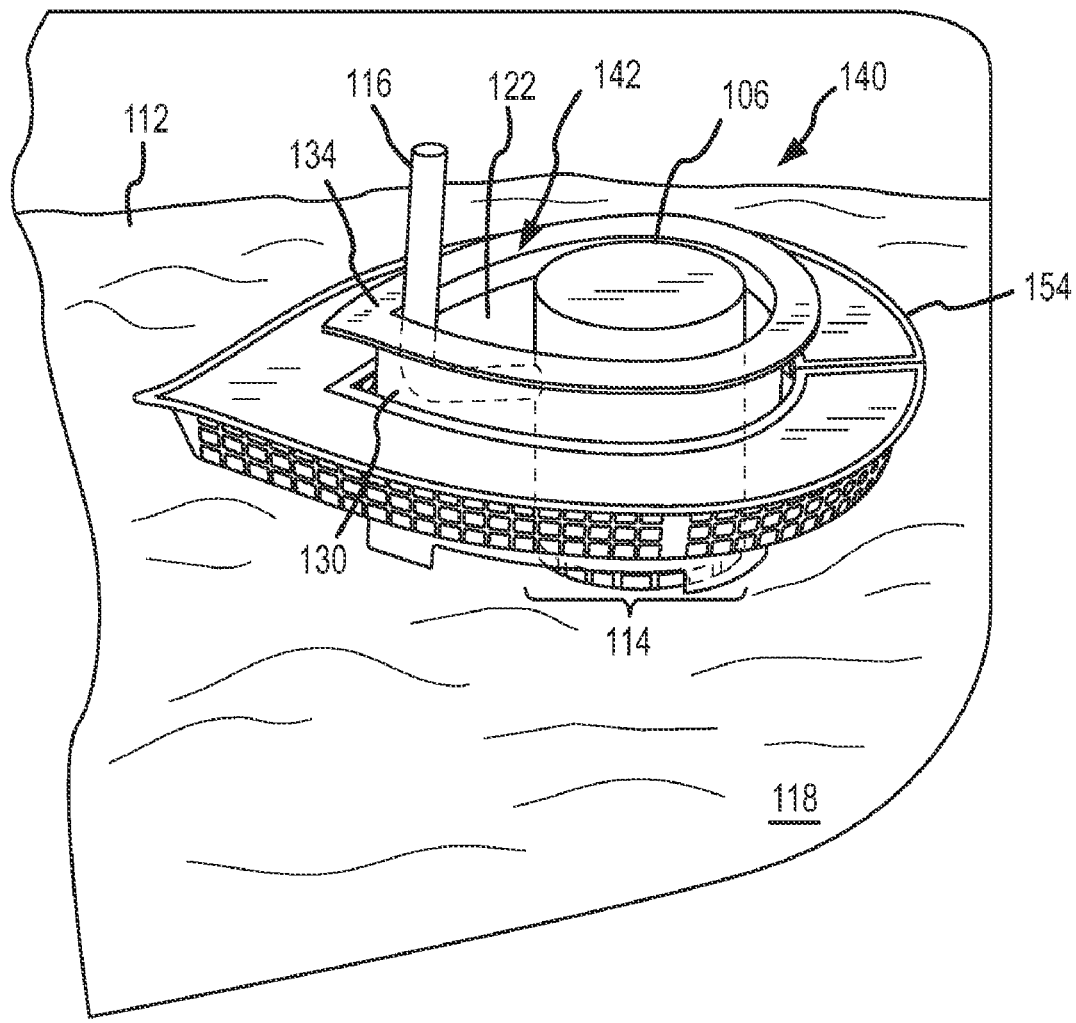
FIG. 7 illustrates a perspective view of another embodiment of a water pollution prevention apparatus.

Shown in FIG. 7 is another embodiment of a water pollution prevention apparatus 140 for use in a bilge 118 of a marine vessel. As with the embodiment discussed above, the apparatus 140 includes a locator 142 and an absorber 154, which floats on a surface of fluid 112 in the bilge 118 to absorb petrochemicals present within the fluid 112 in the bilge 118. However, in the embodiment of FIG. 7, a continuous sidewall 130 of the locator 142 defines an enclosed volume and the absorber 154 is disposed about an outside perimeter of the locator 142. That is, the sidewall 130 of the locator 142 defines a vertically enclosed volume 122 in the fluid 112 and the absorber 154 defines an enclosed space on the surface of the fluid 112 between the sidewall 130 and the absorber 154. As shown, the sidewall 130 is positioned within the bilge 118 substantially perpendicular to a fluid line therein.

The sidewall 130 of the locator/isolator 142 creates a barrier that prevents floating petrochemicals from entering into the enclosed volume 122. Bilge fluid, beneath the floating petrochemicals, enters the enclosed volume 122 through openings near the base of the sidewall 130. As shown, the combination of the sidewall 130 acting as a barrier and the absorber 154 absorbing petrochemicals isolates the enclosed volume 122 from the receipt of petrochemicals even with changing fluid levels in the bilge. That is, as the level of the fluid 112 raises within the bilge 118, the absorber 154 floats up along the sidewall 130 of locator/isolator 142 with a level of the fluid 112. Likewise as the level of fluid 112 recedes, the absorber 154 floats down along the locator sidewall 130. In any case, as the level of fluid 112 changes the lateral position of the absorber 154 is maintained by the locator sidewall 130. Thus, the locator/isolator 102 defines a predetermined path of travel for the absorber 154 as a function of the level of fluid 112 in the bilge 118.

Figure 8A:
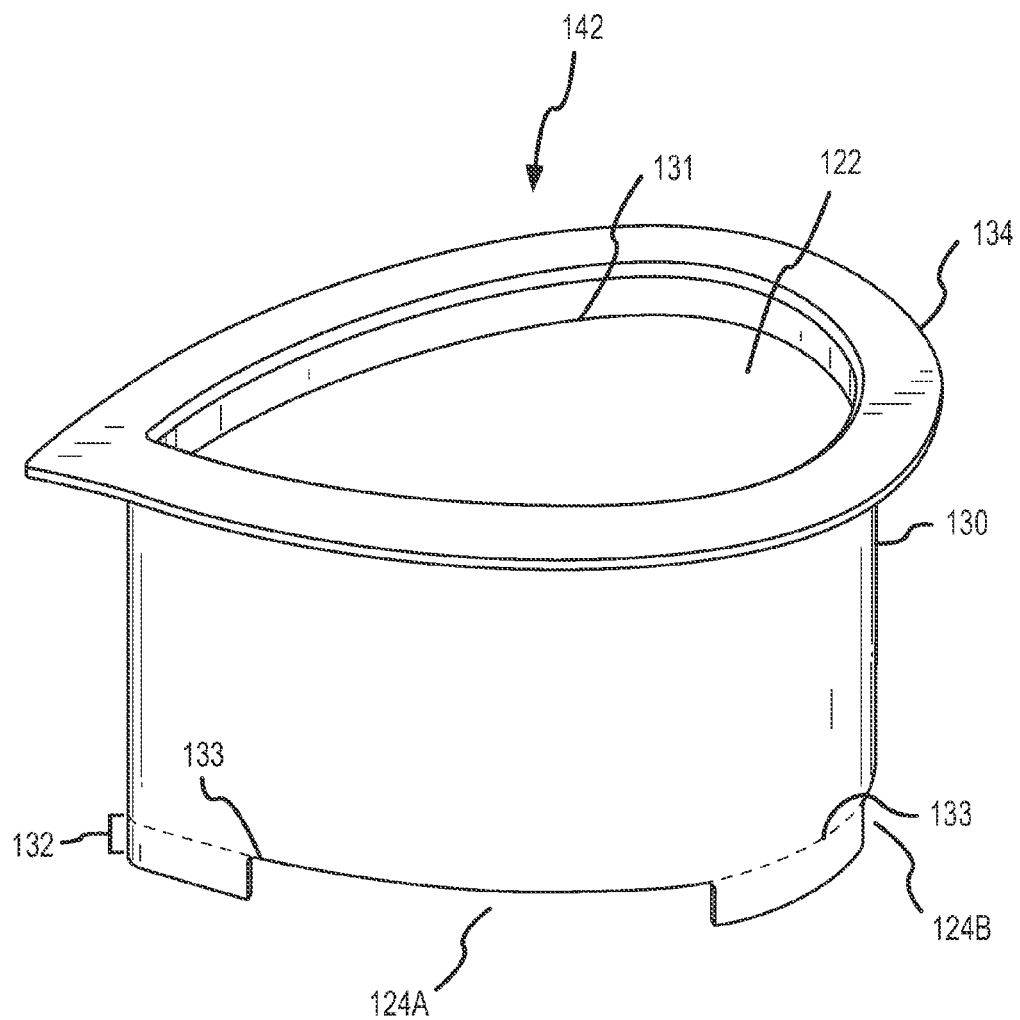
FIG. 8A illustrates a perspective view of one embodiment of a petrochemical isolator for use in a bilge of a marine vessel.

Referring now to FIG. 8A, a perspective view of the locator/isolator 142 of the water pollution prevention apparatus 100 is shown. As noted, the locator/isolator 142 includes an annular sidewall 130, which defines a vertically enclosed volume 122 between a top sidewall edge 131 and a bottom sidewall edge 133, and which is configured to position an absorber 154 within a bilge 118 of a marine vessel. Extending through a non-continuous portion or base 132 of the sidewall 130 are openings 124A and 124B (collectively openings 124 unless specifically referenced) that allow fluid 112 to be introduced into the enclosed volume 122. That is, the openings 124 provide a passageway for bilge fluid 112 to enter the enclosed volume 122 for removal. Additionally, the locator/isolator 142 includes a lip 134 that limits vertical movement of a floating absorber 154 when positioned about the locator/isolator 142.

The openings 124 are located at a base of locator/isolator 142 and extend through the sidewall 130 to provide passageways for fluid in the bilge 118 to enter enclosed volume 122 and, in the present embodiment, be pumped out of the bilge 118 by a pump disposed within enclosed volume 122. The openings 124 are located near the base 132 of the sidewall 130 so that fluid may be drawn from as low a point in bilge 118 as possible. The dimensions of openings 124 may vary depending on the particular bilge, bilge pump and/or absorber being used. Generally, the total area openings 124 will be at least as large as the combined inlet area of an inlet of a pump or fluid discharge tube disposed within the enclosed volume 122. Such sizing prevents restricting fluid flow to such a pump and/or fluid outlet. In some embodiments, the height of openings 124 (i.e., as measured from the base 132) may be related to a thickness of the absorber 154. For instance, the maximum height of openings 124 may be no greater than a thickness of the absorber 154, or, the maximum height of openings 124 may be a fraction of the thickness of the absorber 154 (e.g., not greater than one-half the thickness of the absorber). In such embodiments, the sidewall 130 prevents entry of petrochemicals into the enclosed volume 122 when the fluid level in the bilge is above the maximum height of the openings 124. Further, the absorber 154 may prevent entry of petrochemicals into the enclosed volume when a fluid level in the bilge 118 drops to a level lower than the maximum height of the openings 124. As will be appreciated, the locator/isolator 142 may alone prevent entry of petrochemicals into the enclosed volume if a minimum fluid level does not drop below a maximum height of the openings 124 (e.g., a bottom edge 133 of the sidewall 130).

The width of openings 124 may also be varied. For example, a first opening 124A may extend around a substantial portion of one-half the perimeter of base 132 while a second opening 124B may extend around a substantial portion of the other half of the perimeter of the base 132. Moreover, locator/isolator 142 is not limited to having two openings. For instance, the openings 124 may include multiple slots and/or apertures such that multiple openings define a screen that is sized to prevent entry of debris of a predetermined size into the enclosed volume 122.

Figure 8B:
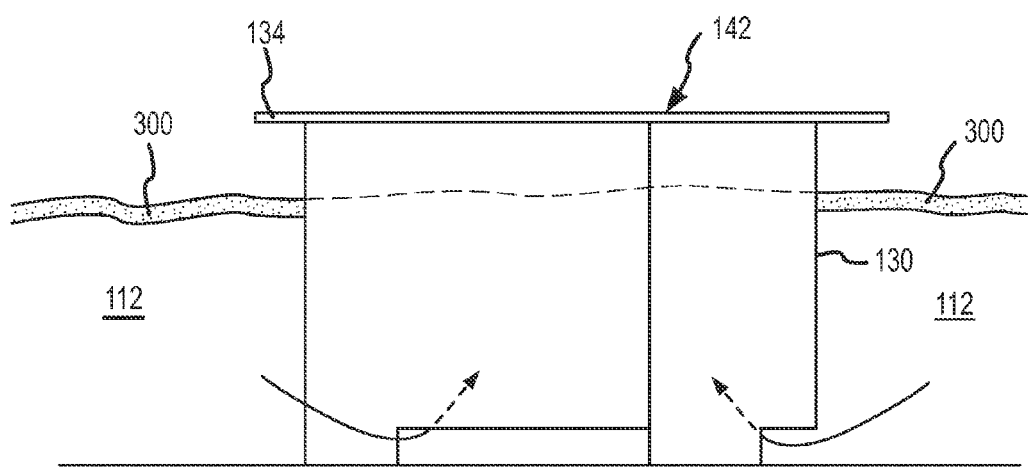
FIG. 8B illustrates a side view of one embodiment of a petrochemical isolator for use in a bilge of a marine vessel.

As illustrated in FIG. 8B, the sidewall 130 above the openings 124 is continuous about its periphery (i.e., a solid wall). Accordingly, one advantage of this continuous sidewall 130 is that it provides a barrier to petrochemicals 300 floating on the surface of bilge fluid 112 when the bilge fluid level is above a height of the openings 124 (i.e., as measured from the base). Accordingly, this prevents a fluid port (e.g., of a pump or fluid conduit) disposed within the enclosed volume 122 from receiving petrochemicals 300 floating on a surface of the fluid 112 outside of the sidewall 130. That is, the surface of the fluid 112, and all of the fluid within the sidewall is substantially free of petrochemicals 300. In the present embodiment, the float switch of the pump 106 may be set to actuate operation of the pump 106 at a level near or just below the top edge 131 of the sidewall 130 and terminate operation of the pump 106 at a level above the bottom edge 133 of the sidewall 130. In this regard, the sidewall 130 alone may prevent entry of petrochemicals into the enclosed volume 122 during a pumping cycle.

The lip 134 is designed to limit vertical movement of the floating absorber 154. As shown in FIG. 7, the lip 134 extends outwardly from the sidewall 130 to prevent the absorber 154 from rising beyond a height of the lip 134. If the level of liquid rises above a height of the sidewall 130, the lip 134 will prevent the absorber 154 from floating above the sidewall 130, where it would no longer be maintained in the predetermined lateral position by the sidewall 130. Accordingly, the lip 134 should extend far enough away from enclosed volume 122, so that it will contact and hold the inner perimeter of the absorber 104. In other embodiments the lip 134 may be segmented including several separate pieces disposed about the periphery of the sidewall 130. That is, the lip 134 may be discontinuous and include a plurality of lips.

In the present embodiment, the lip 134 is removably connected to the sidewall 130. This allows for removing the absorber 142 when it has reached its limit for absorbing petrochemicals. To facilitate removable connection, a base portion of the lip 134 includes a channel (not shown) made from a flexible material that accommodates the top edge of the sidewall 134. The channel may be sized slightly smaller than the top edge of the sidewall to provide a frictional fit. The lip 134 may then be easily removed and reconnected to the sidewall 130. In other embodiments, the lip 134 may include other removable fastening structures that facilitate the selective removal of the lip 134.

Figure 9:
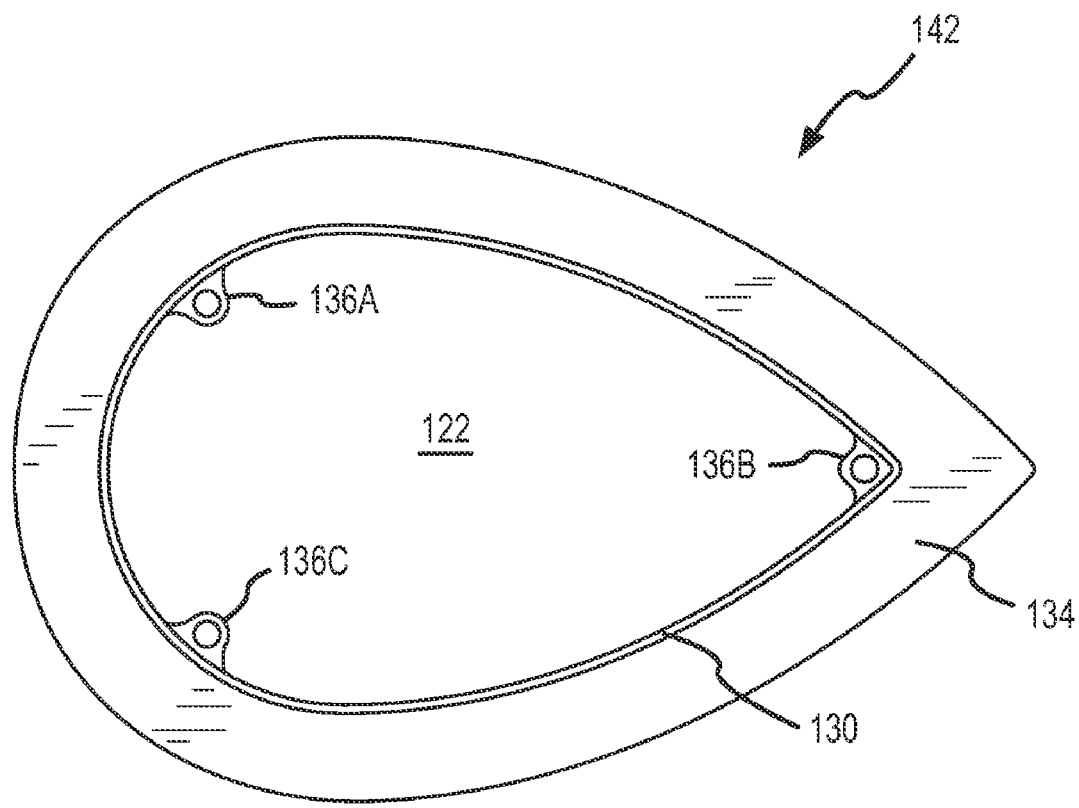
FIG. 9 illustrates a top view of the isolator shown in FIG. 7.

FIG. 9 illustrates a top view of the locator/isolator 102. As shown, the locator/isolator 142 includes base members 136A-C (collectively 136 unless specifically referenced), located near the base 132 of the sidewall 130. These base members 136 are designed to facilitate attachment of the locator/isolator 142 to a surface in the bilge 118. In illustrated embodiment, the base members 136 each include an aperture (e.g., collar) for receiving a fastener for attaching the locator/isolator 142 to a surface in the bilge 118. In other embodiments, the locator/isolator 142 may include, for example, a base plate (e.g., floor) that may be connected (e.g., adhered) to a surface in the bilge.

In the present embodiment, the bilge pump 106 is positionable within the sidewall 130 of the locator/isolator 142. Accordingly, the enclosed volume 122 defined by the sidewall 130 is sized to accommodate a particular bilge pump that will be positioned therein. As shown in FIG. 9, the cross-sectional area of enclosed volume 122 has a generally elliptical or 'water drop' shape. The use of a non-round shape provides an advantage in addition to limiting lateral movement of the absorber 154 in the bilge 118. Specifically, a non-round shape prevents the absorber 154 from rotating or spinning about locator/isolator 142, which may create turbulence in the fluid surrounding the absorber 154. That is, the non-round shape provides damping of the absorber that may reduce splash over of petrochemicals. Further, use of an elongated shape having a length dimension greater than a width dimension may allow for routing an outlet conduit 116 (shown in FIG. 7) from a pump 106 out of the enclosed volume 122 while reducing the overall size of the apparatus 100. However, the shape of the enclosed volume 122 defined by the sidewall 130 is not limited to the illustrated shape. In other embodiments, the cross-sectional shape defined by the sidewall 130 may be any of a plurality of different shapes including, without limitation, circular, regular polygonal shapes and/or irregular shapes.

Figure 10:
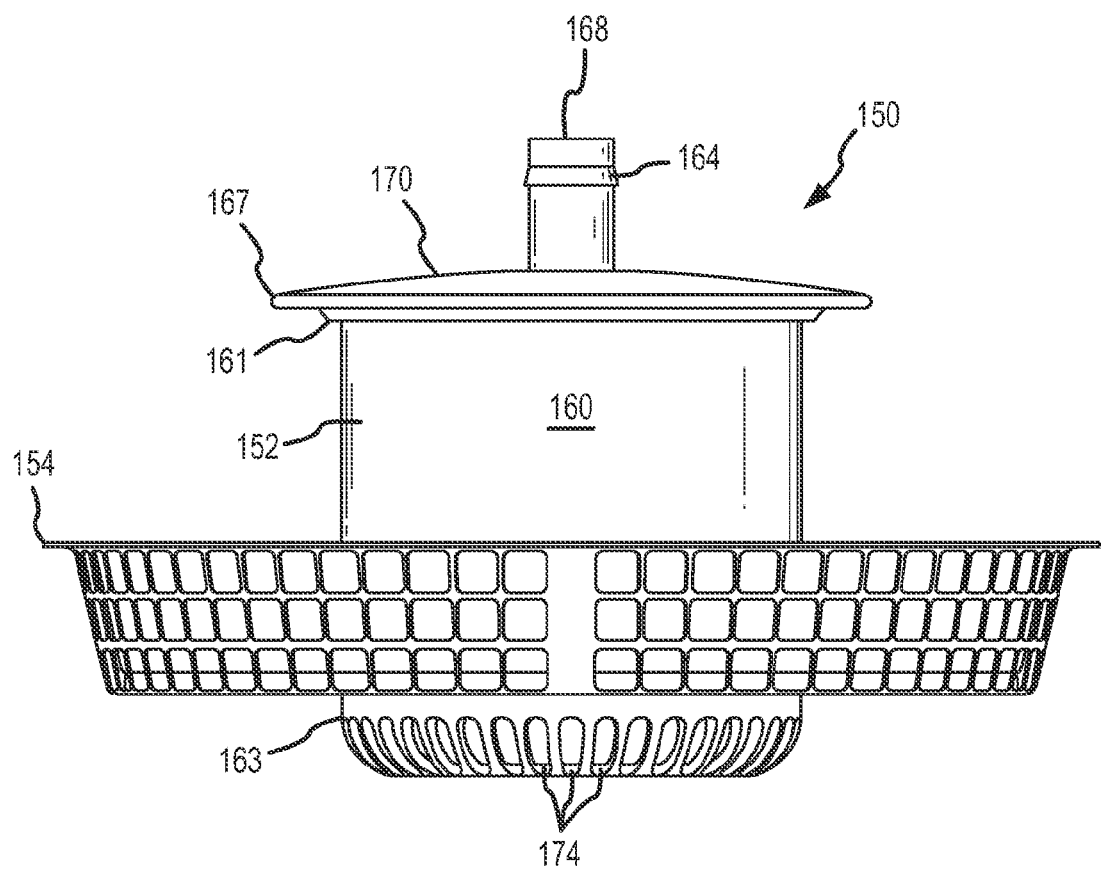
FIG. 10 illustrates a perspective view of another embodiment of a pollution prevention apparatus for use in a bilge of a marine vessel.
Figure 11:
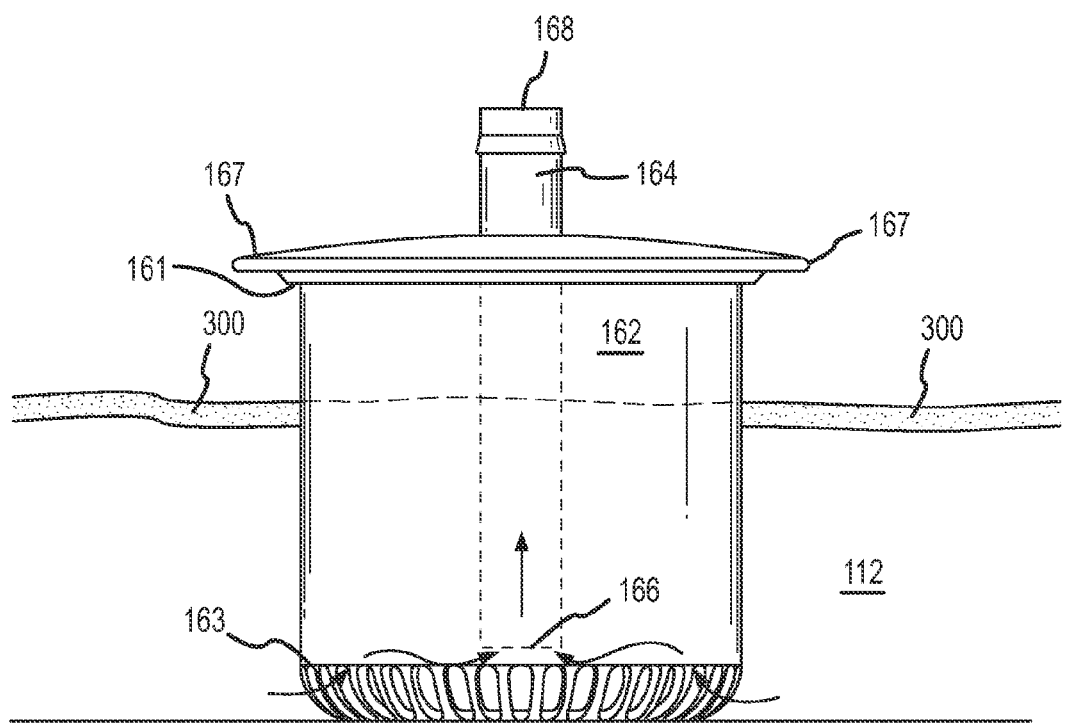
FIG. 11 illustrates a side cross-sectional view of the apparatus of FIG. 10.

FIGS. 10 and 11 illustrate another embodiment of a water pollution prevention apparatus 150 for use in a bilge of a marine vessel. The apparatus 150 includes a locator/isolator 152 that is adapted to position an absorber 154 that floats on a surface of a fluid 112 in the bilge 118. As shown, the absorber 154 is disposed about a perimeter of the locator/isolator 152 and the locator/isolator 152 includes a continuous sidewall 160 that defines a vertically enclosed fluid volume 162. The function of the locator/isolator 152 and the absorber 154 are substantially identical to those discussed in relation to the apparatus 140 of FIGS. 7-9. However, in contrast to the apparatus 140 discussed in relation to FIGS. 7-9, the present apparatus 150 does not house a pump within the enclosed volume 162. Rather, the present apparatus 150 is utilized to position a fluid conduit 164 within the enclosed volume 162.

Referring to the view of FIG. 10, a cap member 170 is shown. The cap member extends over the top surface of the locator/isolator 152 to provide a continuous cover over the top edge 161 of the sidewall 160. As shown, a lip 167 is integrated onto the periphery of the cap member 170 for use in limiting vertical movement of the absorber 154. In addition, use of a cap member 170 that extends over the entirety of the locator/isolator prevents petrochemicals floating on bilge fluid 118 from entering into the enclosed volume 162 over the top edge of the sidewall 160. Further, the cap member 170 allows for positioning the fluid conduit 164 at a desired location within the enclosed volume 162. In this regard, it may be desirable to locate the fluid conduit 164 through the cap member 170 at a location such that the inlet 166 of the conduit 164 is spaced from the sidewall 160. This may prevent creation of an area of high suction that may draw petrochemicals beneath the sidewall 160 and/or the floating absorber 154.

The fluid conduit 164 extends into the enclosed volume 162 such that an inlet end/port 166 is operative to draw fluid from the enclosed volume 162. A second end of the fluid conduit 164 extends outside of the enclosed volume 162 and may be interconnected to a bilge pump using, for example, a flexible hose extending therebetween. In one embodiment, the cap member permits adjusting the height of the fluid conduit 164 such that the inlet may be positioned at a desired height above, for example a bottom surface of the bilge.

In the present embodiment, a plurality of openings 174 are disposed about a perimeter of the base of the sidewall 160 that are sized to prevent passage of debris of a predetermined size into the enclosed volume 162. Stated otherwise, the plurality of openings 174 form a strainer or screen that permits fluid into the enclosed volume 162 while preventing debris from entering the enclosed volume 162 and, hence, being drawn into the inlet port 166 of the fluid conduit 164. Though shown as a plurality of equally spaced slots, it will be appreciated that the openings 174 may include any appropriate openings (e.g., circular holes) having a predetermined maximum size. What is important is that the openings 174 provide an open area that is preferably larger than the area of the inlet port 166 of the fluid conduit 164 while preventing the entry of debris into the enclosed volume 162. As discussed above, it may also be preferable that the openings 174 do not extend above a predetermined height along the sidewall 160 (e.g., bottom edge 163) of the locator/isolator 152 such that the sidewall 160 above the openings 174 forms a continuous barrier.

Figure 12:
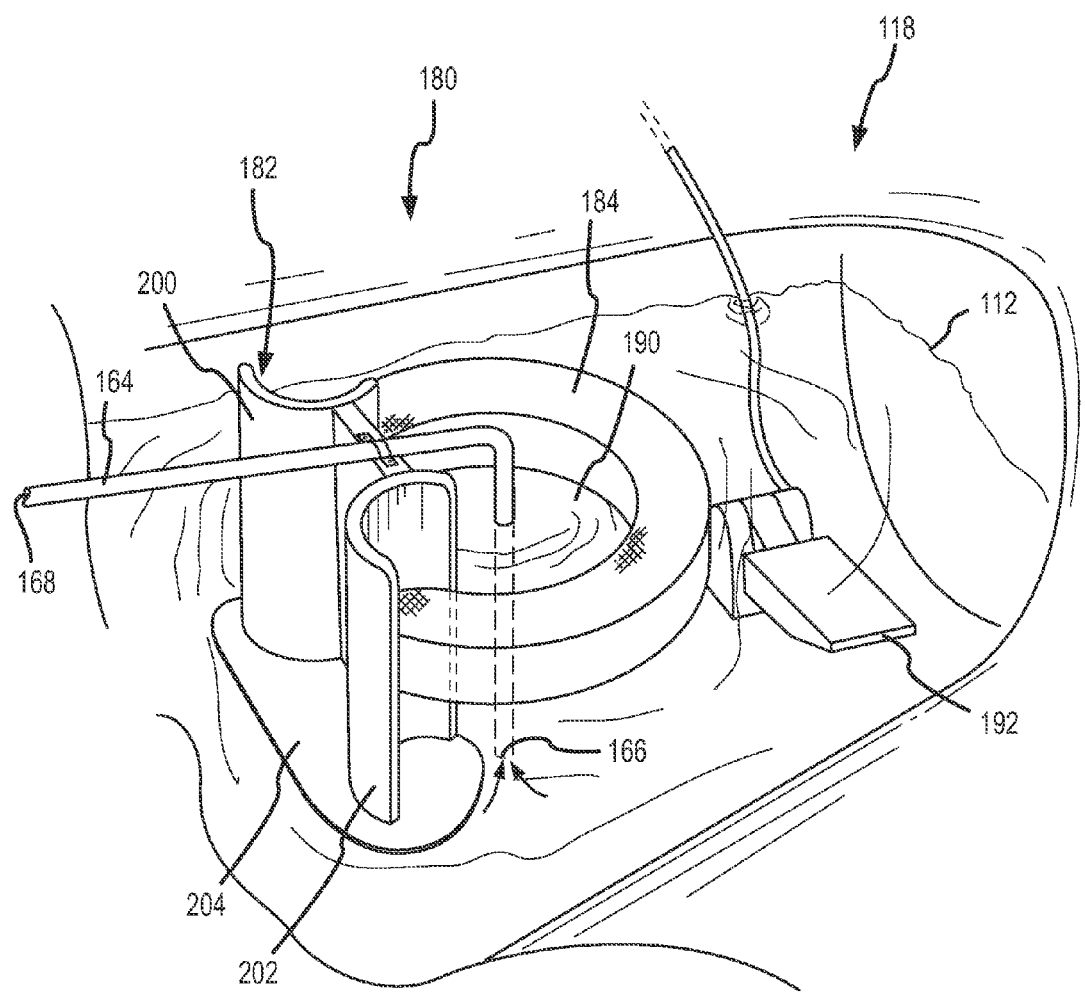
FIG. 12 illustrates a further embodiment of a water pollution prevention device.

FIG. 12 illustrates another embodiment of a water pollution prevention apparatus that is similar to the embodiment of FIGS. 1-6. Again, the water pollution prevention apparatus 180 includes a locator 182 and an absorber 184 that collectively define an enclosed surface area 190 in the fluid 112 that is free of petrochemicals. As shown, the locator 182 is further operable to position and support a fluid conduit 164, which may extend to a location vertically below the enclosed surface area 190. That is, rather than house a pump 106, the present embedment positions the fluid conduit 164 within a fluid volume that is defined at its surface by the enclosed surface area 190. This allows an inlet 166 of the fluid conduit 164 to draw fluid from the bilge 118 free of petrochemicals. Further, the locator may allow for the height of the inlet 166 to be adjusted to, for example, maximize the removal of fluid from the bilge 118. An outlet 168 of the fluid conduit 164 may be interconnected to an inlet of a bilge pump (not shown). In this regard, the water pollution prevention apparatus of FIG. 12 and other embodiments that support an inlet of a fluid conduit in fluid area and/or volume that is free of petrochemicals may advantageously be utilized with bilge pumps that are removed from the bilge fluid and/or the bilge 118.

Figure 13:
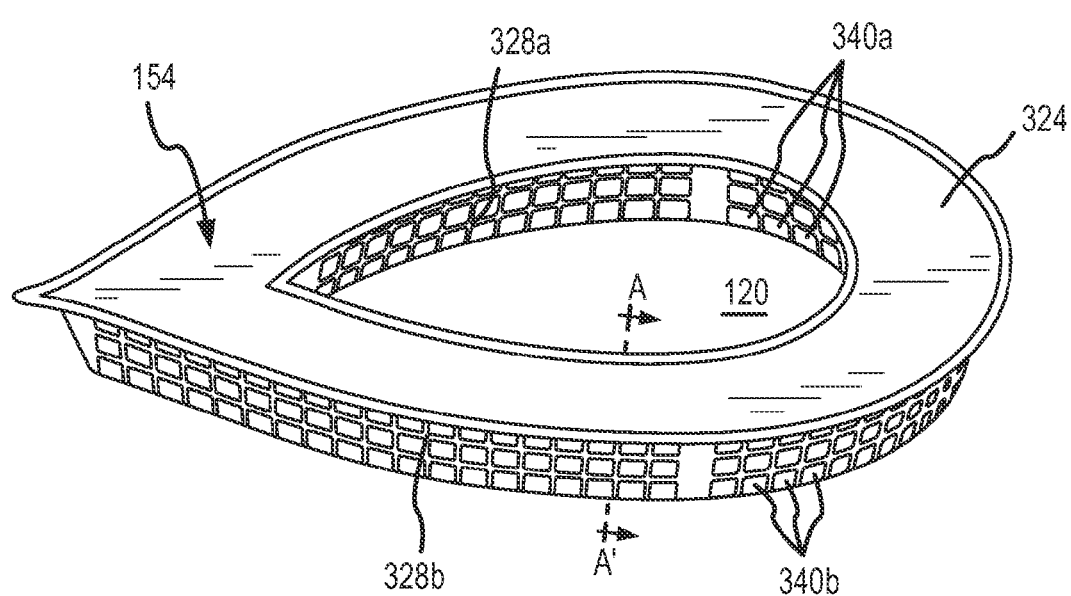
FIG. 13 illustrates a perspective view of one embodiment an absorber that may be utilized with the water pollution prevention apparatuses of FIGS. 7 and 10.
Figure 14:
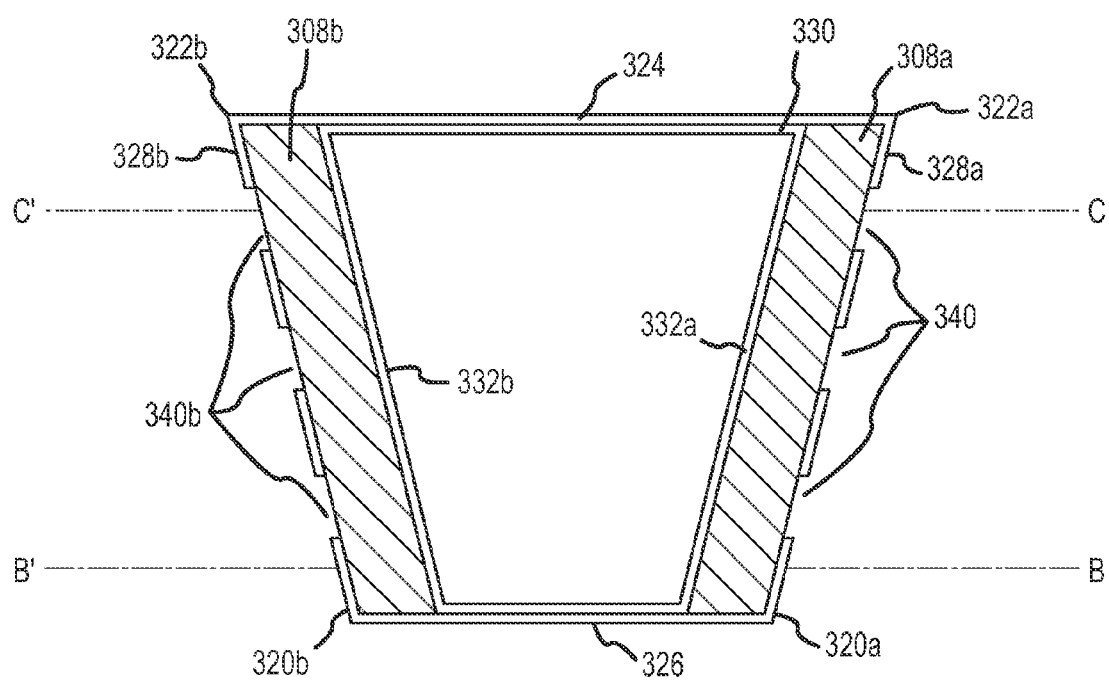
FIG. 14 illustrates a cross-section of the absorber of FIG. 13.

FIGS. 13 and 14 show and a perspective view and a partial cross-sectional view along section line A-A', respectively, of the absorber 154. As shown, the absorber 154 is formed as a closed geometric shape that defines an enclosed interior area 120. More specifically, the absorber 154 includes an inner sidewall 328a and an outer sidewall 328b. Top edges 322a and 322b of the sidewalls 328a and 328b are interconnected by a top wall 324 and bottom edges 320a and 320b of the sidewalls 328A, 328B are interconnected by a bottom wall 326. In this regard, the sidewalls 328, 328b, the top wall 324 and the bottom wall 326 define an interior volume of the absorber 154. Disposed within the interior volume of the absorber 154 are petrochemical absorbing members 308a and 308b and a buoyant member 330. The petrochemical absorbing members 308a and 308b are formed of a petrochemical absorbing material. The buoyant member 330 provides buoyancy to the absorber 154, which allows the absorber to float on a surface of fluid 112 within the bilge 118.

The inner and outer sidewalls 328a and 328b each include a plurality of apertures 340a and 340b that allow fluid to enter into the enclosed volume defined by the absorber 154. In this regard, the inner and outer sidewalls 328a, 328b form grated members for the absorber 154 that permit fluid to enter into the absorber 154 such that it may be absorbed by the petrochemical absorbing material 302.

In the embodiment shown, the absorber 154 utilizes first and second petrochemical absorbing members 308a and 308b. Specifically, an inner petrochemical absorbing member 308a is positioned adjacent to the inner sidewall 328a and an outer petrochemical absorbing member 308b is positioned adjacent to the outer sidewall 328b. Use of the inner petrochemical absorbing material 308a permits the absorber 154 to absorb petrochemicals that may be present, e.g., due to splash over, within the enclosed interior area 120.

As shown, the buoyant member 330 is formed as a fully enclosed (e.g., hermetically sealed) member that is disposed within the enclosed volume of the absorber 154. That is, the buoyant member 330 comprises an air filled volume within the absorber 154. Preferably, the buoyant member 330 is sized to provide desirable characteristics to the absorber 154. Specifically, the volume of the buoyant member 330 may be sized in relation to the oil carrying capacity of the petrochemical absorber members 308a and 308b. In one arrangement, when the petrochemical absorbing members 308a and 308b are substantially free of petrochemicals, the air volume of the buoyant member 330 may permit a majority of the outer sidewall 328b of the absorber 154 to be exposed above the surface of the bilge fluid while maintaining a predetermined lower portion (e.g., ¼ inch, 1 cm, etc.) of the sidewall 328b beneath the surface. That is, when free of petrochemicals, a majority of the absorber 154 may float above the fluid surface as illustrated by low fluid line B-B' shown in FIG. 14. In contrast, when the petrochemical absorbing members 308a and 308b are saturated with petrochemicals, the absorber 154 may float lower relative to the fluid surface as illustrates by high fluid line C-C'. Preferably, the volume of the buoyant member 330 is sized such that when saturated at least a portion of the absorber sidewall 328b remains exposed above the high fluid line C-C'. In this regard, even when saturated the absorber 154 may provide a physical barrier to entry of floating petrochemicals into the enclosed interior area 120 of the absorber 154. Stated otherwise, buoyant member 330 is sized to maintain a surface level of fluid within the bilge between top and bottom edges of the absorber 154 and more preferably maintain the surface level at predetermined locations spaced from the top and bottom edges of the sidewall 328b.

As shown, the buoyant member 330 includes continuous sidewalls 332a and 332b. As shown, these continuous sidewalls 332a and 332b extend from the top and bottom edges of the absorber 154. In this regard, the continuous sidewalls 332a, 332b provide a physical barrier to the entry of petrochemicals into the interior area 120 of the absorber 154 when a fluid level is between the top and bottom edges of the continuous sidewalls 332a, 332b. That is, petrochemicals floating on the surface of bilge fluid cannot pass through the absorber 154 due to the continuous sidewalls of the buoyant member 330.

A number of additional variations of the petrochemical absorber 154 exist and warrant discussion. For instance, rather than using inner and outer absorbing members 308a and 308b, the absorber 154 may utilize a single absorbing member 308b positioned adjacent to the outer sidewall. Further, the size and thickness of the absorbing material 302 may be varied for a particular application. In another arrangement, the top wall 324 may be removable from the absorber 154 such that the petrochemical absorbing members(s)/material may be replaced. In this regard, the absorber 154 may serviceable and/or reusable.

Figure 15:
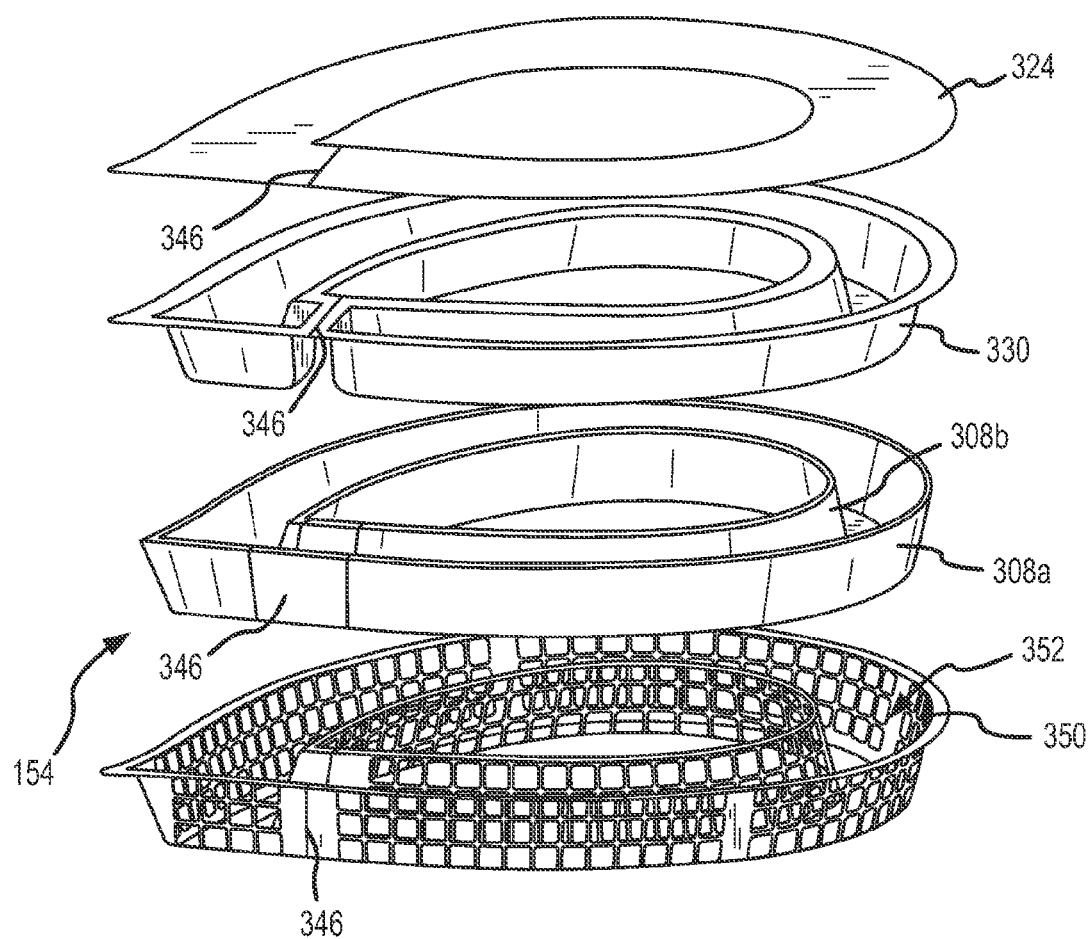
FIG. 15 illustrates and alternate embodiment of the absorber of FIG. 13.

FIG. 15 illustrates an exploded perspective view of an alternate embodiment of the absorber 154. As shown, the individual components are disposed in a stacked arrangement. In this regard, a grated member 350, having grated inner and outer sidewalls, has a U-shaped cross-section that defines an interior volume 352, which is sized to receive the petrochemical absorber members 308a, 308b and the buoyant member 330. As shown, the first and second petrochemical absorber members 308a, 308b are disposed on opposing inside surfaces of the U-shaped grate member 350. The buoyant member 330, which is also formed of a U-shaped cross-section, fits between the first and second petrochemical absorbing members 308a, 308b. Finally, a top wall 324 this interconnected to the top edge of the buoyant member 330 and grated member 350. For instance, the top wall 324 maybe adhered or thermally bonded to the buoyant member 330 and grated member 350. In this arrangement, interconnection of the top wall 324 to the buoyant member 330 hermetically seals the buoyant member. In contrast to the continuous absorber shown in FIG. 13, the absorber 154 of FIG. 15 is non-continuous. In this regard, each of the components 324, 330, 308 and 350 include an aligned seam 346. The seam allows for abutting ends of the absorber 154 to be separated. In this regard, the absorber 154 maybe flexed to create an opening into the interior area. This may allow for positioning the absorber around, for example, a discharge tube of a pump within a bilge.

Figure 16:
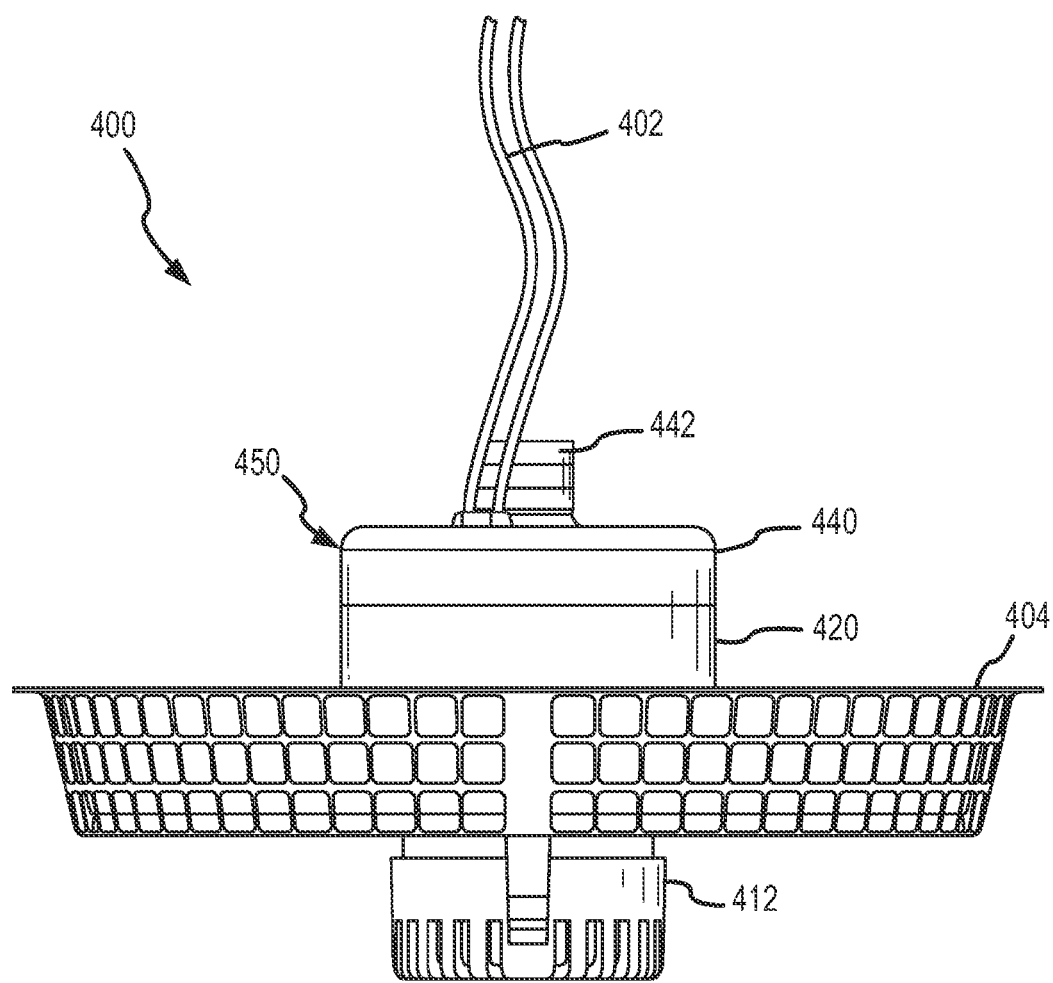
FIG. 16 illustrates a further embodiment of a water pollution prevention device.

FIG. 16 illustrates another embodiment of a water pollution prevention apparatus 400. In contrast to the apparatuses discussed above, the present embodiment does not utilize a separate locator to position a floating petrochemical absorber. Rather, the outside surface of the pump housing 450 is utilized to position a floating petrochemical absorber 404. As shown, the pump housing 450 is defined by two interconnected members, a main housing member 420 and a cap member 440. The housing is sized to receive and support a fluid displacement pump 406. Further, the housing is releaseably connectable to a grate member 412 that may be fixedly attached to a bilge surface. The housing 450 is designed to direct fluid displaced by the fluid pump 406 through a vertical discharge 442. Of note, the outside surface of the vertical discharge tube 442 is serrated such that flexible hose may be interconnected thereto and maintained thereon. However, this is not a requirement.

As will be appreciated, use of the vertical discharge 442 allows for an outside surface of the housing 450 to be utilized to guide the floating petrochemical absorber 404. See FIG. 16. That is, the absence of a horizontal discharge extending outward from the pump housing facilitates use of a floating petrochemical absorber 404. In this regard, the outside surface of the housing 450 may define a vertical pathway for the absorber 404 and may limit its lateral movement. As discussed above, the floating petrochemical absorber 404 defines an isolated interior area that is substantially free of floating petrochemicals. Accordingly, the petrochemical absorber 404 may prevent the passage of petrochemicals into the pump housing 450.

Figure 17:
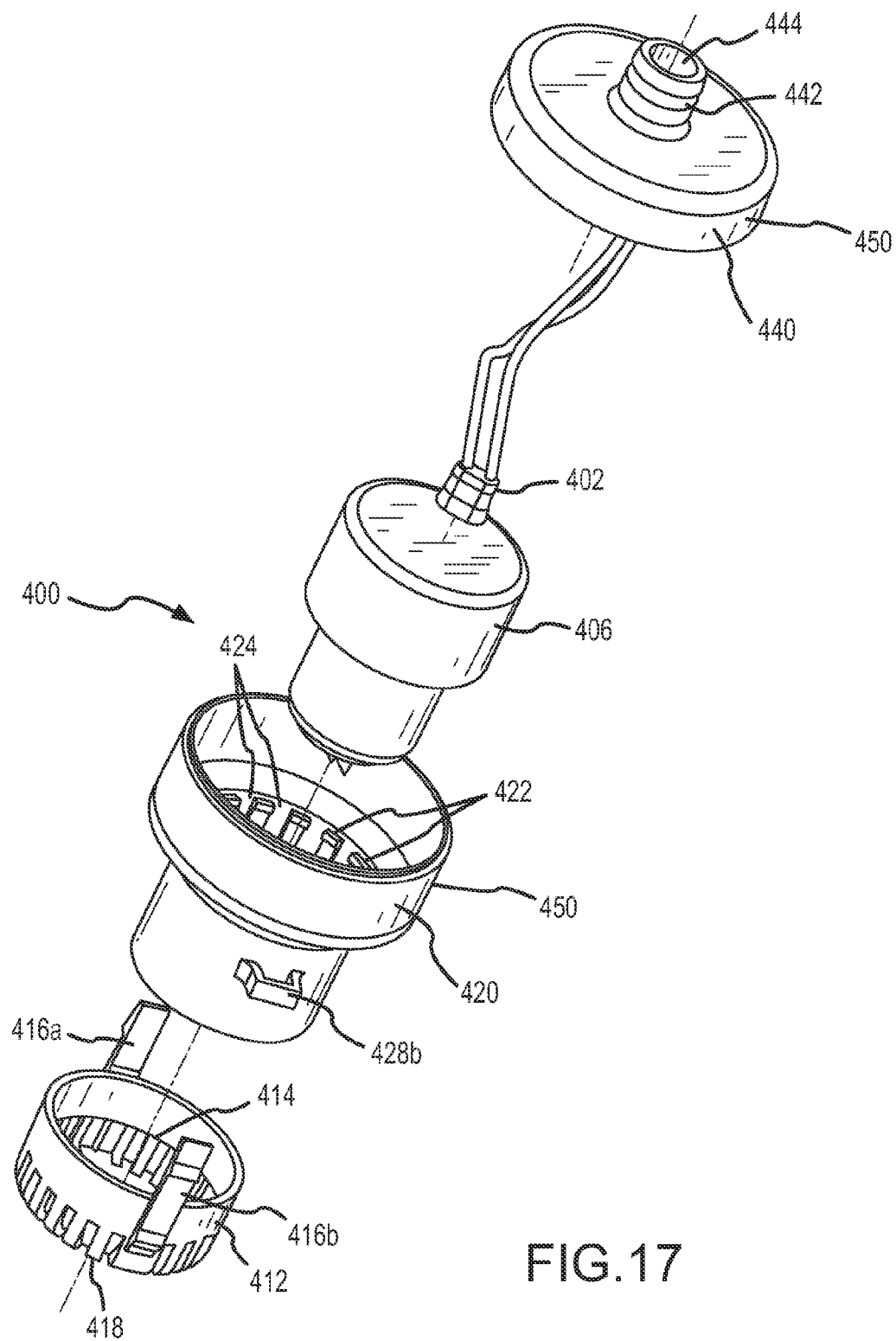
FIG. 17 illustrates an exploded perspective view of the device of FIG. 16.
Figure 18:
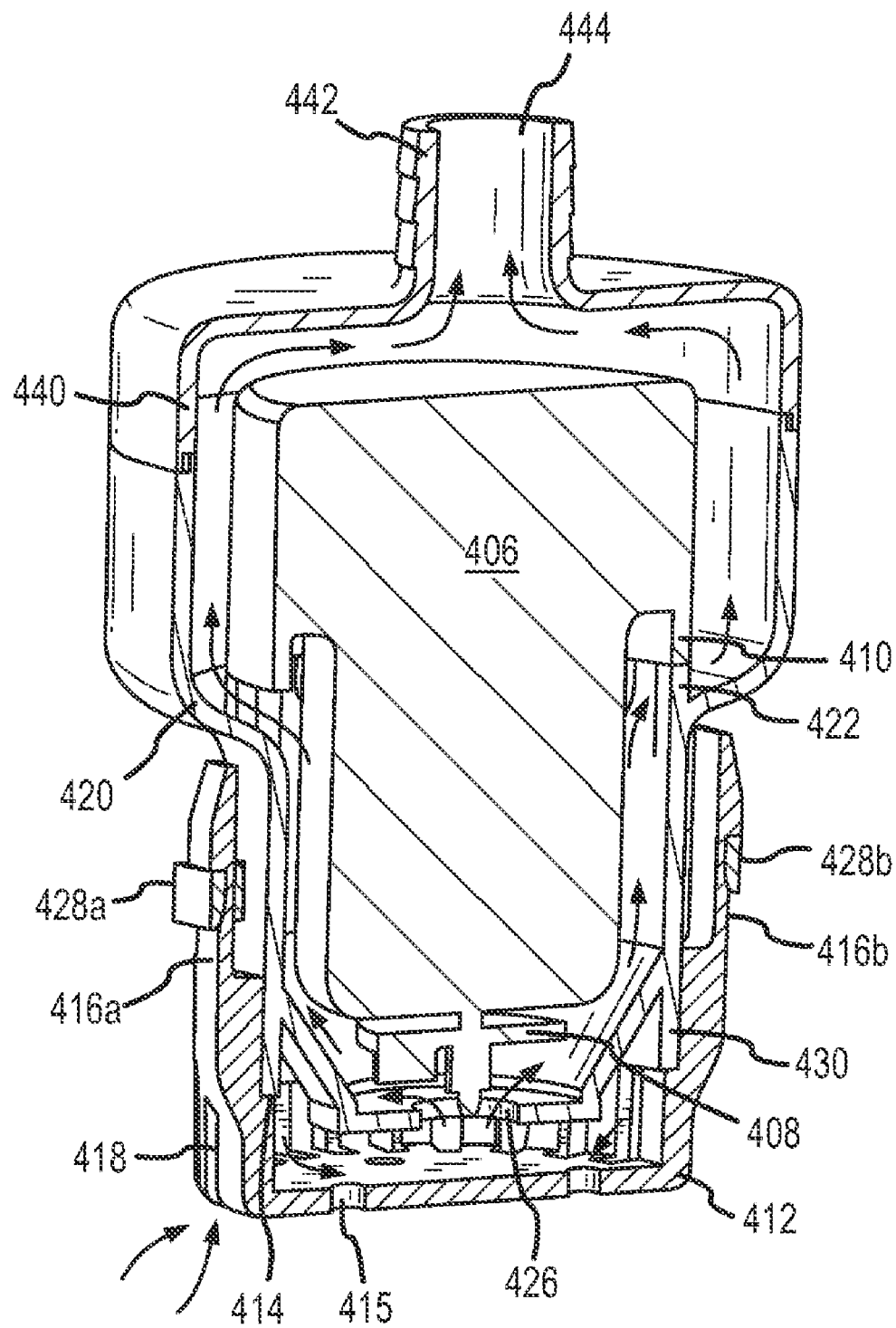
FIG. 18 illustrates a cross-sectional view of the device of FIG. 16.

Referring to FIGS. 17 and 18, an exploded perspective and an assembled cross-sectional view of the water pollution prevention apparatus 400 is illustrated. As shown, the main housing member 420 and cap member 440 define an internal volume that houses the pump 406. In this regard, an inside surface of the main housing member 420 is sized to receive and support the pump 406 such that an impeller 408 of the pump 406 is disposed near a fluid inlet 426 near the bottom of the main housing 420. Further, the internal volume defined by the main hosing member 420 and cap member 440 is sized such that a space exits between the inside surface of those members 420, 440 and an outside surface of the pump 406. This space is utilized as a fluid flow path between the fluid inlet 426 into the internal volume and the vertical discharge 442.

As shown, the impeller 408 is interconnected to a rotational axis of an electrical motor of the of the pump 406 such that, during operation, the impeller 408 and one or more vanes disposed thereon are rotated to displace fluid. The rotation of the impellor 408 displaces fluid upwardly around at least a portion of the outside surface of the pump to the vertical discharge 442. This fluid flow around the pump 406 may provide cooling for the motor of the pump 406. In the embodiment shown, the entirety of the pump 406 is immersed in fluid when fluid is discharged out of the vertical discharge 442. As will be appreciated, this immersion may provide enhanced cooling of the pump motor. However, other pumping devices may be utilized as well. Such pumping device may include, without limitation, rotary pumps and positive displacement pumps.

As shown, an inside periphery of the main housing member 420 includes a plurality of upwardly extending studs 422 that are separated by a plurality of spaces 424. The studs 422 define a shelf is sized to supportably engage an apron 410 extending downwardly from the pump 406. Once the apron 410 of the pump is disposed on the studs 422, the spaces 424 between the studs 422 form apertures through the shelf. These apertures permit fluid to flow from the impellor 412 upwardly to the vertical outlet 442. Specifically, referring to FIG. 17 it will be noted that fluid may be drawn through the inlet 426 by the impeller 408 then displaced upwardly between the inside surface of the main housing 420 and the outside surface of the pump 406. The fluid may proceed through the spaces 424 between the studs 422 and then continue upwardly through the main housing member 420, through the cap member 440 and through the vertical discharge 442, which defines the fluid outlet 444 of the housing 450. The total area of spaces 424 may be selected for pump performance purposes. For instance, the area of the spaces may be selected in conjunction with a power of the pump and/or the height to which the pump will discharge fluid. What is important is that the total area defined by the spaces may be adjusted.

In addition to the studs 424, which vertically support the pump 406, the interior surface of the main housing member 420 may further include one or more vertical vanes (not shown) that allow for laterally positioning the pump 406 within the interior volume of the housing 450 while allowing vertical fluid flow through the housing 450.

The grate member 412 includes a plurality of inlets 418 disposed about its periphery. These inlets 418 are sized to prevent debris in the bilge from entering into the grate member 412 where they may be drawn into the inlet 426 of the housing 450. As shown, grate member 412 includes a shelf 414 disposed about its inside periphery that is sized to support a housing apron 430 that extends downwardly from the main housing body 420. When interconnected, the grate member 412 may provide the support necessary to maintain the housing 450 in an upright position.

As shown, the grate member 412 is removably interconnected to the main housing member 420. Specifically, first and second opposing tabs 416a, 416b are interconnected to opposing outside surfaces of the grate member 412. The tabs are sized to extend over an outside surface of the main housing member 420. Accordingly, the outside surface of the main housing member 420 includes first and second contact surfaces for engaging the tabs 416a, 416b. As shown, these contact surfaces are formed as sockets 428a, 428b that are sized to receive the tabs 416a, 416b. In this embodiment, each tab 416 includes a tapered tip that allows the tab to be deflected inwardly as it is disposed through the corresponding socket 428. Once disposed a predetermined distance through the socket 428, a lip on the tab 416 is operative to catch a horizontal edge (e.g., top edge) of the corresponding socket 428. Accordingly, by depressing the tabs 416, 418 inwardly, the housing 450 may be vertically lifted and thus separated from the grate member 412.

The grate member 412 may be fixedly connected to the bottom surface of a bilge utilizing, for example, one or more fasteners, which may extend through apertures 415 in the bottom surface (e.g., base) of the grate member 412. In this regard, the apparatus 400 may be periodically disassembled for maintenance of the grate member (i.e., cleaning of the inlets 418 and/or replacement of the housing and pump as necessary.

The cap member 440 is adapted for interconnecting to the top edge of the main housing member 420. In this regard, once the pump 406 is disposed within the main housing body 420 cap member 440 may be connected to the main housing member 420 in any appropriate manner. For instance, the main housing member 420 and cap member 440 may be permanently interconnected (e.g., adhered) or, the cap member 440 may be releaseably interconnected to the main housing member 420. In the latter regard, the cap member 440 may be removable to permit replacement of the pump 406. What is important is that interconnection between the main housing member 420 and cap member 440 is operative to maintain fluid within the housing 450 (e.g., fluid tight). As shown by FIGS. 15 and 16, the pump 406 includes an electrical connector 402 that extends through the cap member 440. In this regard, the cap member may include an aperture (not shown) through which the electrical connector 402 passes and may further include a grommet to fluidly seal that aperture. In the embodiment shown, the vertical discharge 442 is centered on the cap member 440. However, it will be appreciated that such centering is not required. It will be further appreciated that horizontal discharge may also be utilized so long as the horizontal discharge is a predetermined distance above the base as defined by the grate member 412. That is, a horizontal discharge may be utilized so long as an adequate distance between the base and the discharge tube is provided to permit the floating petrochemical absorber 404 to travel along an outside surface of the housing 450.

As shown, an outwardly extending lip 446 (e.g., stop) is interconnected to the cap member 440 which limits the vertical movement of the floating absorber 404. However, it will be appreciated that the lip 446 is not necessary for operation of the apparatus 400. For instance, to maintain the floating petrochemical absorber 404 disposed about a housing 450 without out a lip, the pump 406 may be selectively operated at predetermined fluid levels within the bilge. For instance, referring to FIG. 15 it may be desirable to begin operation of the pump at a high water mark B-B' such that the bottom edge of the floating absorber 404 does not float above a top edge of the housing 450. In this regard, the housing 450 may maintain a lateral position of the floating absorber 404 within the bilge 118 without utilizing the lip 446. Of further note, it may be desirable that the floating petrochemical absorber 404 have a thickness that is greater than the height of the inlets 418 of the grate member 412. In this regard, as the fluid level drops within the bilge 118, the absorber 404 may settle on the bottom surface of the bilge and still provide isolation for the inlets 418.

It is anticipated that those skilled in the art will appreciate numerous other examples that are within the scope of the present invention. For instance, it will be appreciated from the first described embodiment, that the double housing design of the locator 102 and semi-enclosed design of the absorber 104, accommodates bilge pumps, such as pump 106, that include an outlet conduit 116 connected out the side of the pump. Alternatively, however, a locator having a single locator housing and single locator channel may be utilized with bilge pumps having their outlet conduit out the top of the pump housing. Those skilled in the art will appreciate numerous methods of accomplishing the single locator and enclosed absorber design. For instance, the locator channel may be configured in the shape of a "T" with a mating "T" shaped connector utilized on the enclosed absorber to make the slidable connection there between. Similarly, it is possible to utilize this single locator and enclosed absorber design with the bilge pump 106, where the outlet conduit 116 is routed up and over the top of the locator. In this case, it may be desirable to make the interior space, e.g., 120, of the absorber larger so that it accommodates enclosure of the pump 106 as well as the routing of the outlet conduit 116, to prevent interference during movement of the absorber along the locator.

In another alternative embodiment and regardless of the terminology used herein, the absorber 104 and/or 154 may comprise a material that is impervious to petrochemicals 300, rather than a material that absorbs petrochemicals 300. In this case, the absorber 104 and/or 154 would not remove petrochemicals 300 from the fluid 112, but would still function to isolate the bilge pump 106 and/or a fluid conduit and thereby minimize the discharge of petrochemicals 300 as it would minimize entry of the same into the interior area 120.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A floating petrochemical absorber for positioning about a bilge fluid outlet in a bilge of a marine vessel, comprising:
   a grated member defining a closed geometric shape having an open interior area sized for positioning around a fluid inlet, the grated member having a grated outer sidewall;
   at least one buoyant member disposed within the grated member and having a continuous sidewall that is solid between a top edge and a bottom edge and that extends continuously around the open interior area of the grated member, wherein said at least one buoyant member is sized to maintain a surface level of fluid in a bilge of a marine vessel between a top edge and a bottom edge of the sidewall and provides a physical barrier to the entry of floating petrochemicals into the open interior area of the grated member; and
   a petrochemical absorbing material disposed between the grated outer sidewall and the continuous wall of the buoyant member for absorbing petrochemicals floating on said fluid.

2. The absorber of claim 1, wherein said petrochemical absorbing material is continuous about an inside surface of said grated outer sidewall.

3. The absorber of claim 1, the grated member further comprising:
   an inner grated sidewall extending about the open interior area wherein additional petrochemical absorbing material is disposed between the grated inside sidewall and a continuous sidewall of said buoyant member.

4. The absorber of claim 1, wherein said buoyant member comprises an enclosed volume.

5. The absorber of claim 4, wherein said enclosed volume contains air.

* * * * *